United States Patent
Notaguchi et al.

(10) Patent No.: US 11,240,969 B2
(45) Date of Patent: Feb. 8, 2022

(54) GRAFTING APPARATUS, SOWING APPARATUS, GRAFTED SEEDLING PRODUCTION METHOD, AND GRAFTED SEEDLING PRODUCTION SYSTEM

(71) Applicant: NATIONAL UNIVERSITY CORPORATION NAGOYA UNIVERSITY, Aichi (JP)

(72) Inventors: Michitaka Notaguchi, Nagoya (JP); Kenji Tachibana, Nagoya (JP); Ryusei Yamaguchi, Nagoya (JP)

(73) Assignee: NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 443 days.

(21) Appl. No.: 16/324,666

(22) PCT Filed: Aug. 10, 2017

(86) PCT No.: PCT/JP2017/029110
§ 371 (c)(1),
(2) Date: Feb. 11, 2019

(87) PCT Pub. No.: WO2018/030517
PCT Pub. Date: Feb. 15, 2018

(65) Prior Publication Data
US 2019/0174681 A1 Jun. 13, 2019

(30) Foreign Application Priority Data
Aug. 12, 2016 (JP) .............................. JP2016-158993

(51) Int. Cl.
*A01G 2/32* (2018.01)
*A01G 2/38* (2018.01)
(Continued)

(52) U.S. Cl.
CPC .................. *A01G 2/32* (2018.02); *A01C 7/04* (2013.01); *A01G 2/35* (2018.02); *A01G 2/38* (2018.02)

(58) Field of Classification Search
CPC ... A01C 7/04; A01G 2/32; A01G 2/35; A01G 2/38; A01G 3/00
(Continued)

(56) References Cited

U.S. PATENT DOCUMENTS 6,918,205 B1 * 7/2005 Sowinski ................ A01G 2/35
47/6
2007/0283862 A1 12/2007 Kobayashi et al.
(Continued)

FOREIGN PATENT DOCUMENTS

JP H02127149 U 10/1990
JP H03130015 A 6/1991
(Continued)

OTHER PUBLICATIONS

International Search Report dated Nov. 2, 2017 for corresponding International Application No. PCT/JP2017/029110, filed Aug. 10, 2017.
(Continued)

*Primary Examiner* — Peter M Poon
*Assistant Examiner* — Jeffrey R Larsen
(74) *Attorney, Agent, or Firm* — Westman, Champlin & Koehler, P.A.; David D. Brush

(57) ABSTRACT

A grafting apparatus includes plate-shaped grafting members each provided with, on a main surface on one side in a thickness direction thereof, at least one plant holder to hold a plant for grafting. The grafting apparatus includes a cutter and a joiner. The cutter is configured to cut a stem of the plant for grafting that is held by the at least one plant holder of each of the grafting members. The joiner is configured to
(Continued)

mutually join at least parts of the grafting members, while the at least one plant holder holds a part of the plant for grafting that has been cut by the cutter, to thereby mutually join parts of the plants for grafting.

18 Claims, 23 Drawing Sheets

(51) Int. Cl.
*A01G 2/35* (2018.01)
*A01C 7/04* (2006.01)

(58) Field of Classification Search
USPC .............................................................. 47/6
See application file for complete search history.

(56) References Cited

U.S. PATENT DOCUMENTS

| 2011/0154730 A1* | 6/2011 | Okoshi | ................... A01G 2/32 47/6 |
|---|---|---|---|
| 2017/0027108 A1 | 2/2017 | Hanamura | |

FOREIGN PATENT DOCUMENTS

| JP | 2007274996 A | 10/2007 |
|---|---|---|
| JP | 2007300867 A | 11/2007 |
| JP | 2013215133 A | 10/2013 |
| JP | 5584350 B1 | 9/2014 |
| JP | 2015123069 A | 7/2015 |
| SU | 1586604 A | 8/1990 |
| WO | 9414314 A | 7/1994 |
| WO | 2011107943 A1 | 9/2011 |

OTHER PUBLICATIONS

Written Opinion of the International Searching Authority dated Nov. 14, 2017 for corresponding International Application No. PCT/JP2017/029110, filed Aug. 10, 2017.
Extended European Search Report dated Jan. 15, 2020 in corresponding European Patent Application No. 17839581.0.
International Preliminary Report on Patentability and English translation of the Written Opinion of the International Searching Authority dated Feb. 12, 2019 for corresponding International Application No. PCT/JP2017/029110, filed Aug. 10, 2017.
Extended European Search Report dated Jun. 25, 2020 in corresponding European Patent Application No. 17839581.0.

* cited by examiner

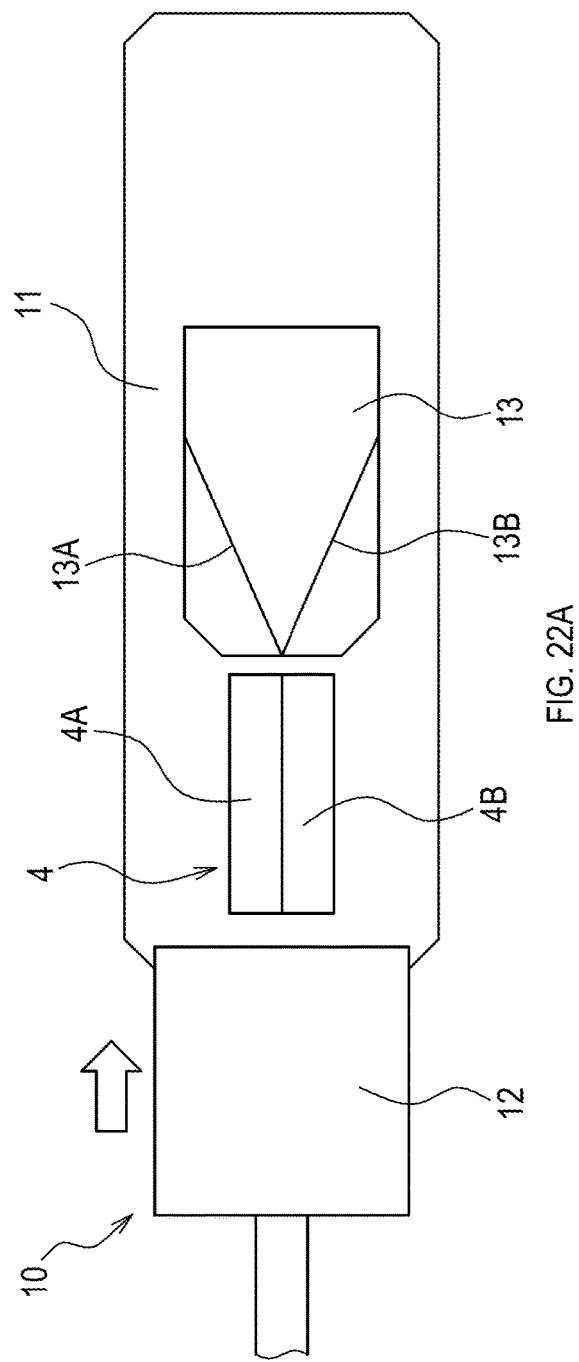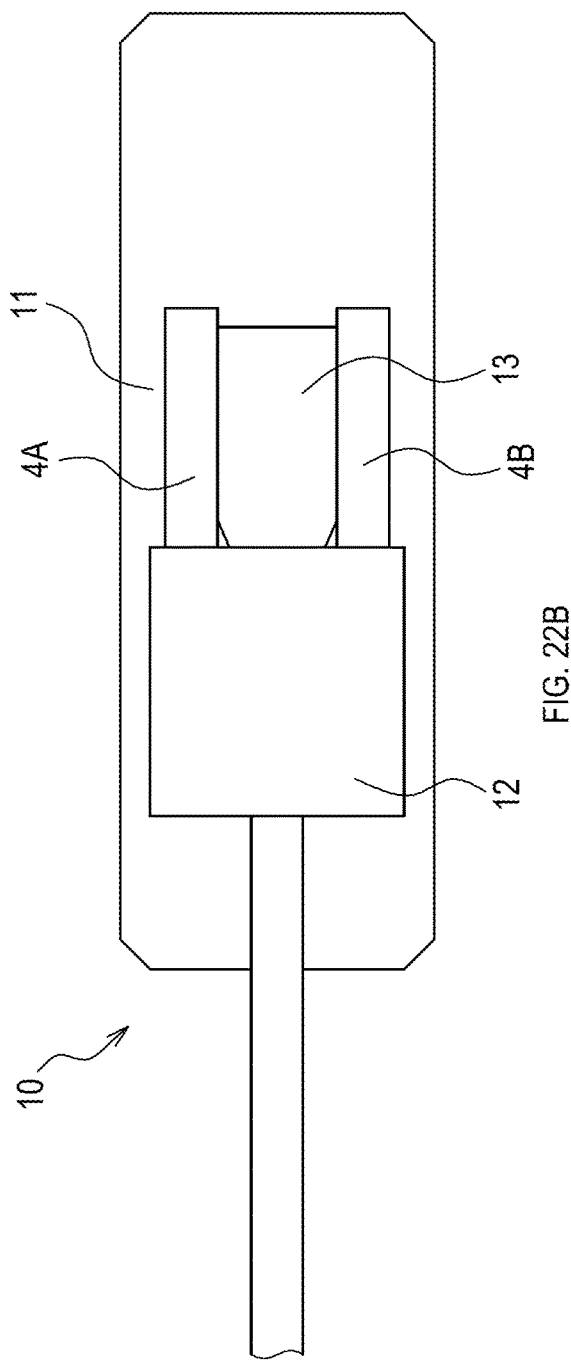

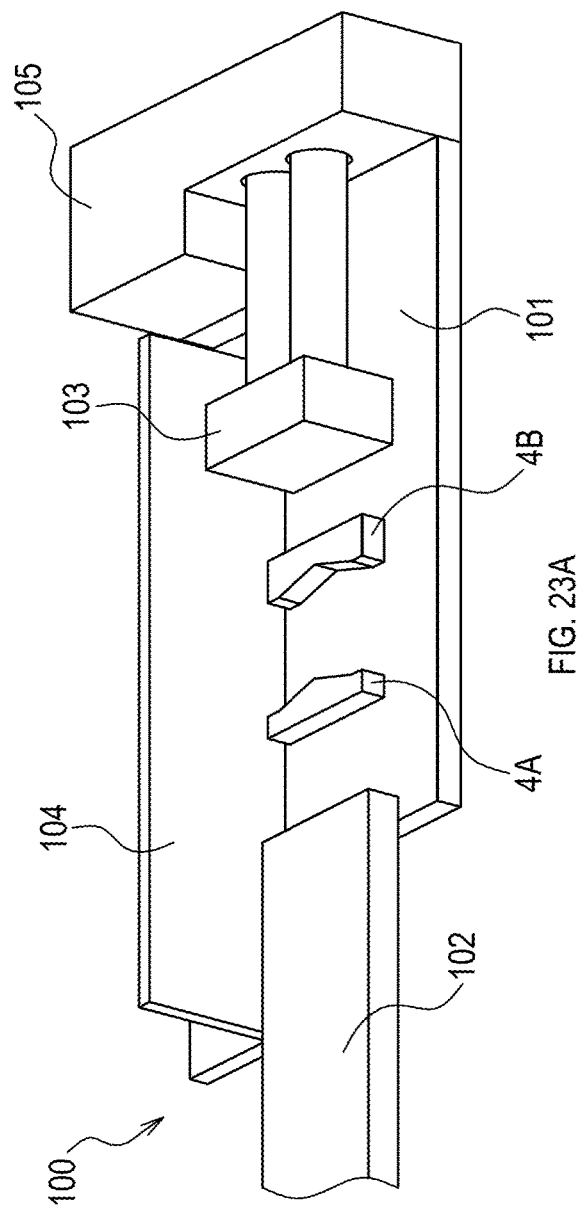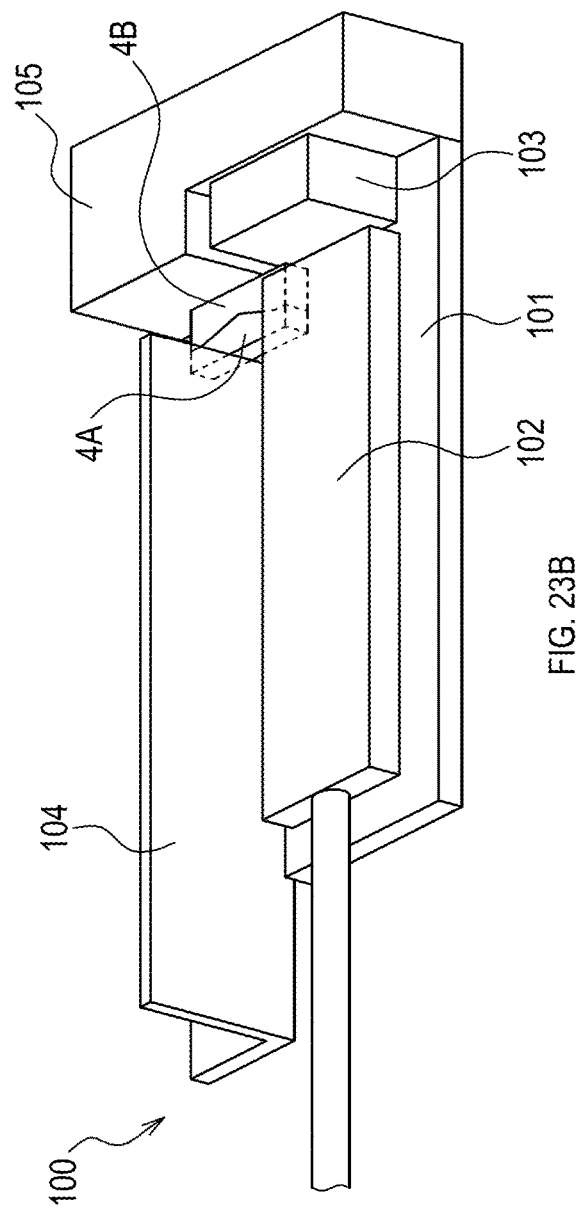

GRAFTING APPARATUS, SOWING APPARATUS, GRAFTED SEEDLING PRODUCTION METHOD, AND GRAFTED SEEDLING PRODUCTION SYSTEM

CROSS-REFERENCE TO RELATED APPLICATION

This Application is a Section 371 National Stage Application of International Application No. PCT/JP2017/029110, filed Aug. 10, 2017, which claims the benefit of Japanese Patent Application No. 2016-158993 filed on Aug. 12, 2016 with the Japan Patent Office, the contents of which are hereby incorporated by reference in their entireties.

TECHNICAL FIELD

The present disclosure relates to a grafting apparatus, a sowing apparatus, a grafted seedling production method, and a grafted seedling production system.

BACKGROUND ART

Grafting is a widely used technique in the fields of agriculture and horticulture for the purpose of avoiding soilborne diseases and replant failure, improving quality and yield, propagating new varieties, and so on. Although grafting is widely spread regardless of whether for business use or home use, grafting is mostly carried out manually. Thus, there are problems, such as complications in grafting operation and resulting low productivity of grafted seedlings. Accordingly, Patent Document 1, for example, discloses a grafting member. Also, Patent Documents 2 and 3 each disclose a grafting apparatus.

PRIOR ART DOCUMENTS

Patent Documents

Patent Document 1: Japanese Unexamined Utility Model Application Publication No. H2-127149
Patent Document 2: Japanese Patent No. 5584350
Patent Document 3: Japanese Unexamined Patent Application Publication No. H3-130015

SUMMARY OF THE INVENTION

Problems to be Solved by the Invention

The grafting member in Patent Document 1 above has a complex structure, which leads to complications in grafting operation using the grafting member, and to low grafting accuracy. Also, the grafting apparatuses in Patent Document 2 and 3 above are large in size, which leads to complications in grafting operation and to low grafting accuracy. Further, the aforementioned grafting member and grafting apparatuses can be applied only to plants that have grown to such a size that can be handled by human hands.

One aspect of the present disclosure provides a grafting apparatus and a sowing apparatus that facilitates grafting operation using grafting members and can achieve improved efficiency and accuracy of grafting operation.

Means for Solving the Problems

One embodiment of the present disclosure is a grafting apparatus including plate-shaped grafting members each provided with, on a main surface on one side in a thickness direction thereof, at least one plant holder to hold a plant for grafting. The grafting apparatus comprises a cutter and a joiner. The cutter is configured to cut a stem of the plant for grafting that is held by the at least one plant holder of each of the grafting members. The joiner is configured to mutually join at least parts of the grafting members, while the at least one plant holder holds a part of the plant for grafting that has been cut by the cutter, to thereby mutually join parts of the plants for grafting.

According to the aforementioned grafting apparatus, grafting operation of the plant for grafting is performed by the cutter and the joiner using the plate-shaped grafting members. This enables easy handling of the grafting member. Each of the plate-shaped grafting members is provided with at least one plant holder on the main surface on the one side in the thickness direction of the grafting member. This enables easy holding of the plants for grafting and easy cutting and joining of the plants for grafting.

Thus, grafting operation using the grafting members is simplified, and improved efficiency and accuracy in grafting operation can be achieved. Consequently, improved productivity and quality of grafted seedlings can be achieved. Also, since size adjustment of the grafting members in accordance with a size of the plants for grafting is easy, grafting operation of, for example, young plants that are difficult to manually handle can be easily performed.

In the grafting apparatus, the cutter may comprise a placement section including a placement surface configured to place thereon the grafting member. In this case, positioning of the grafting member is easy, thereby achieving an accurate arrangement of the grafting member in a specified position. Consequently, the stems of the plants for grafting held by the plant holders of the grafting members can be cut easily and accurately.

The joiner may comprise joining holders each to hold at least a part of the grafting member, while the at least one plant holder holds the part of the plant for grafting that has been cut by the cutter. Also, the joiner may be configured to mutually join at least parts of the grafting members held by the joining holders, to thereby mutually join parts of the plants for grafting. In this case, the parts of the plants for grafting cut by the cutter can be joined easily and accurately.

The at least one plant holder may be formed in the main surface on the one side in the thickness direction of each of the grafting members so as to have a recessed shape that is open toward the one side in the thickness direction. In this case, holding of the plants for grafting in the recessed plant holders is facilitated, and cutting and joining of the plants for grafting while the plants for grafting are held in the recessed plant holders is facilitated.

The grafting members each may comprise a cutting recess having a recessed shape and arranged in the main surface on the one side so as to intersect the at least one plant holder. The cutter may comprise a cutting blade configured to cut the stem of the plant for grafting. The cutting blade may be configured to relatively move in the cutting recess of each of the grafting members, to thereby cut the stem of the plant for grafting held by the at least one plant holder of each of the grafting members. In this case, the stems of the plants for grafting held by the plant holders of the grafting members can be cut easily and accurately.

The grafting apparatus may further comprise a sower configured to place at least one seed of the plant for grafting in the at least one plant holder of each of the grafting members. In this case, the seeds of the plants for grafting can be placed in the plant holders of the grafting members easily and accurately. This enables easier grafting operation using the grafting members, for example, when raising seedlings of the plants for grafting in the plant holders of the grafting members, thereby achieving further improved efficiency and accuracy of the grafting operation.

The sower may comprise a seed container configured to be capable of containing a plurality of seeds; a seed ejector configured to be capable of ejecting the at least one seed from the seed container; and a seed discharger configured to discharge the at least one seed ejected by the seed ejector to the at least one plant holder of each of the grafting members. In this case, sowing operation to place the seeds of the plants for grafting in the plant holders of the grafting members can be performed easily and securely.

The at least one plant holder of the grafting member may comprise a seed storage section configured to place the at least one seed therein, and the sower may be configured to place the at least one seed in the seed storage section of the at least one plant holder of each of the grafting members. In this case, the seeds of the plants for grafting can be placed in the plant holders of the grafting members more easily and accurately.

Another embodiment of the present disclosure is a sowing apparatus including plate-shaped grafting members each provided with, on a main surface on one side in a thickness direction thereof, at least one plant holder to hold a plant for grafting. The sowing apparatus comprises a sower configured to place at least one seed of the plant for grafting in the at least one plant holder of each of the grafting members. The at least one plant holder is formed in the main surface on the one side in the thickness direction of each of the grafting members to have a recessed shape that is open toward the one side in the thickness direction.

According to the aforementioned sowing apparatus, the sower performs sowing operation, using the plate-shaped grafting members, to place the seeds of the plants for grafting in the plant holders of the grafting members. Thus, handling of the grafting members is facilitated, and the seeds of the plants for grafting can be placed in the plant holders of the grafting members easily and accurately. This enables easier grafting operation using the grafting members, for example, when raising seedlings of the plants for grafting in the plant holders of the grafting members, thereby achieving further improved efficiency and accuracy of the grafting operation. Consequently, improvement in productivity and improvement in quality of the grafted seedling can be achieved.

In the sowing apparatus, the sower may comprise: a seed container configured to be capable of containing a plurality of seeds; a seed ejector configured to be capable of ejecting at least one of seed from the seed container; and a seed discharger configured to discharge the at least one seed ejected by the seed ejector to the at least one plant holder of each of the grafting members. In this case, sowing operation to place the seed of the plant for grafting in the at least one plant holder of each of the grafting members can be achieved easily and surely.

The at least one plant holder of each of the grafting members may comprise a seed storage section configured to place the at least one seed therein, and the sower may be configured to place the at least one seed in the seed storage section of the at least one plant holder of each of the grafting members. In this case, the seed of the plant for grafting can be placed in the plant holder of each of the grafting members more easily and accurately.

A further embodiment of the present disclosure is a grafted seedling production method using plate-shaped grafting members each provided with, on a main surface on one side in a thickness direction thereof, at least one plant holder to hold a plant for grafting. The grafted seedling production method comprises: placing a seed of the plant for grafting in the at least one plant holder of each of the grafting members; germinating the seeds; raising seedlings of the plants for grafting subsequent to germination of the seeds; cutting stems of the plants for grafting that are held by the plant holders subsequent to raising the seedlings of the plants for grafting; separating each of the grafting members at a cut section of the plant for grafting; and mutually joining separated parts of the grafting members at cut surfaces thereof, to thereby mutually join cut parts of the plants for grafting.

A yet another embodiment of the present disclosure is a grafted seedling production system using plate-shaped grafting members each provided with, on a main surface on one side in a thickness direction thereof, at least one plant holder to hold a plant for grafting. The grafted seedling production system comprises: a sower to place a seed of the plant for grafting in the at least one plant holder of each of the grafting members; a germinator to germinate the seeds; a seedling raising device to raise seedlings of the plants for grafting subsequent to germination of the seeds; a cutter to cut stems of the plants for grafting that are held by the plant holders subsequent to raising the seedlings of the plants for grafting; and a separator to separate each of the grafting members at a cut section of the plant for grafting; and a joiner to mutually join separated parts of the grafting members at cut surfaces thereof, to thereby mutually join cut parts of the plants for grafting.

According to the grafted seedling production method and the grafted seedling production system, grafting operation, including sowing, is facilitated, and improved efficiency and accuracy in grafting operation can be achieved. Consequently, improvement in productivity and quality of the grafted seedlings can be achieved.

In one embodiment of the present disclosure, at least one of placing the seeds, cutting the stems, separating each of the grafting members, or mutually joining the parts of the plants for grafting may be performed automatically. Such configuration enables further improvements in efficiency and accuracy of grafting operation.

One embodiment of the present disclosure may further comprise healing the joined plant for grafting in the at least one plant holder of the joined grafting members. Such configuration enables improvement in productivity of the grafted seedling.

BRIEF DESCRIPTION OF THE DRAWINGS

FIGS. 22A and 22B are perspective views showing a separating device.

FIGS. 23A and 23B are perspective views showing a joining device.

EXPLANATION OF REFERENCE NUMERALS

1 . . . grafting apparatus, 2 . . . sowing apparatus (sower), 3 . . . cutting device (cutter), 4 . . . joining member (joiner), 5 . . . grafting member, 6 . . . plant for grafting, 51 . . . first main surface (a main surface on one side in a thickness direction), 53 . . . plant holder.

MODE FOR CARRYING OUT THE INVENTION

Hereinafter, an embodiment of the present disclosure will be described with reference to the drawings.

In the present embodiment, arrows indicating directions in figures are drawn for the purpose of facilitating understanding of the relationship among the figures. The present disclosure is not limited to the directions indicated in the figures.

Figure 1:
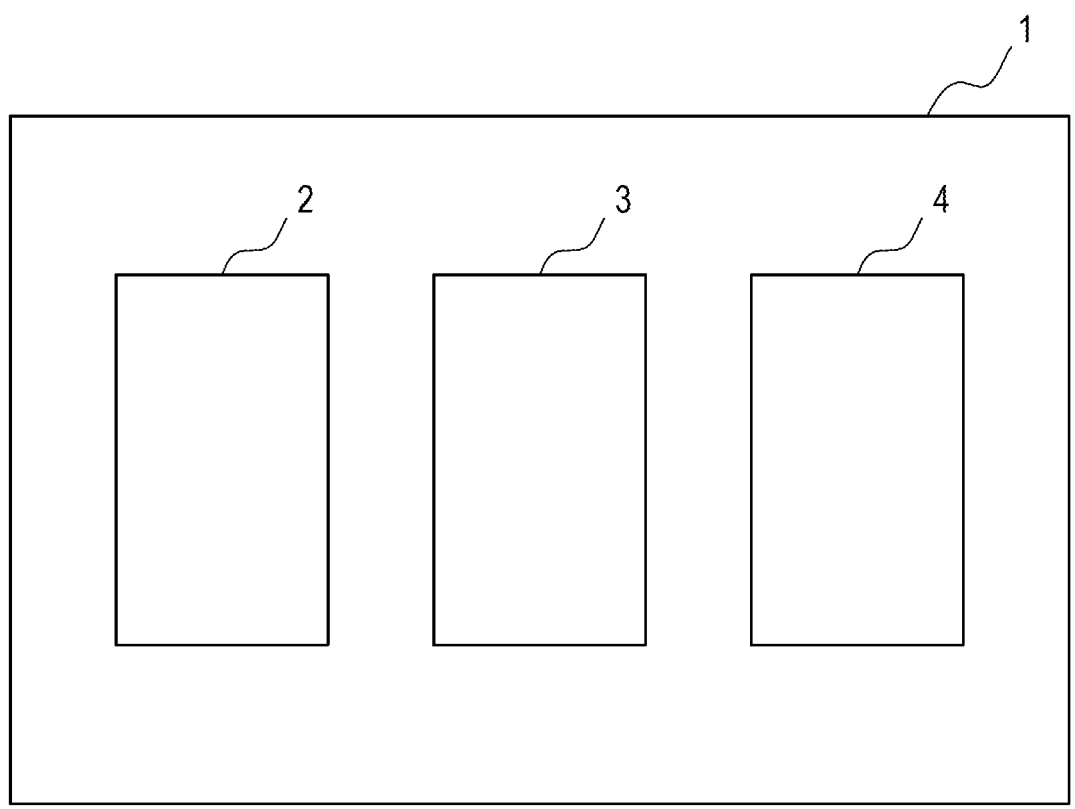
FIG. 1 is an explanatory diagram showing a configuration of a grafting apparatus.

As shown in FIG. 1, a grafting apparatus 1 comprises a sowing apparatus (sower) 2, a cutting device (cutter) 3, and a joining member (joiner) 4. The grafting apparatus 1 is used to graft a plurality of plants for grafting by means of a plurality of grafting members 5 (FIG. 2).

Figure 2:
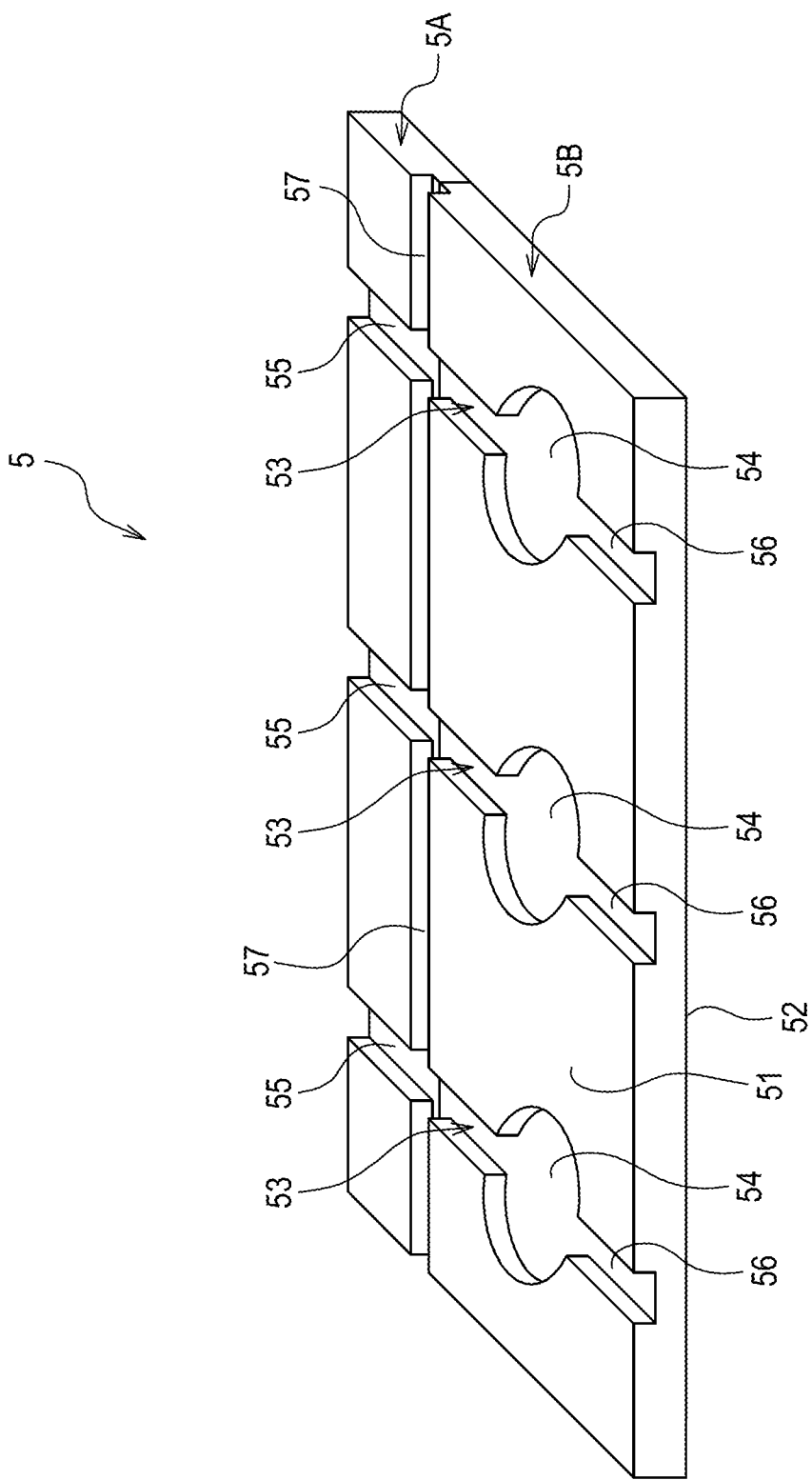
FIG. 2 is a perspective view showing a grafting member.
Figure 3:
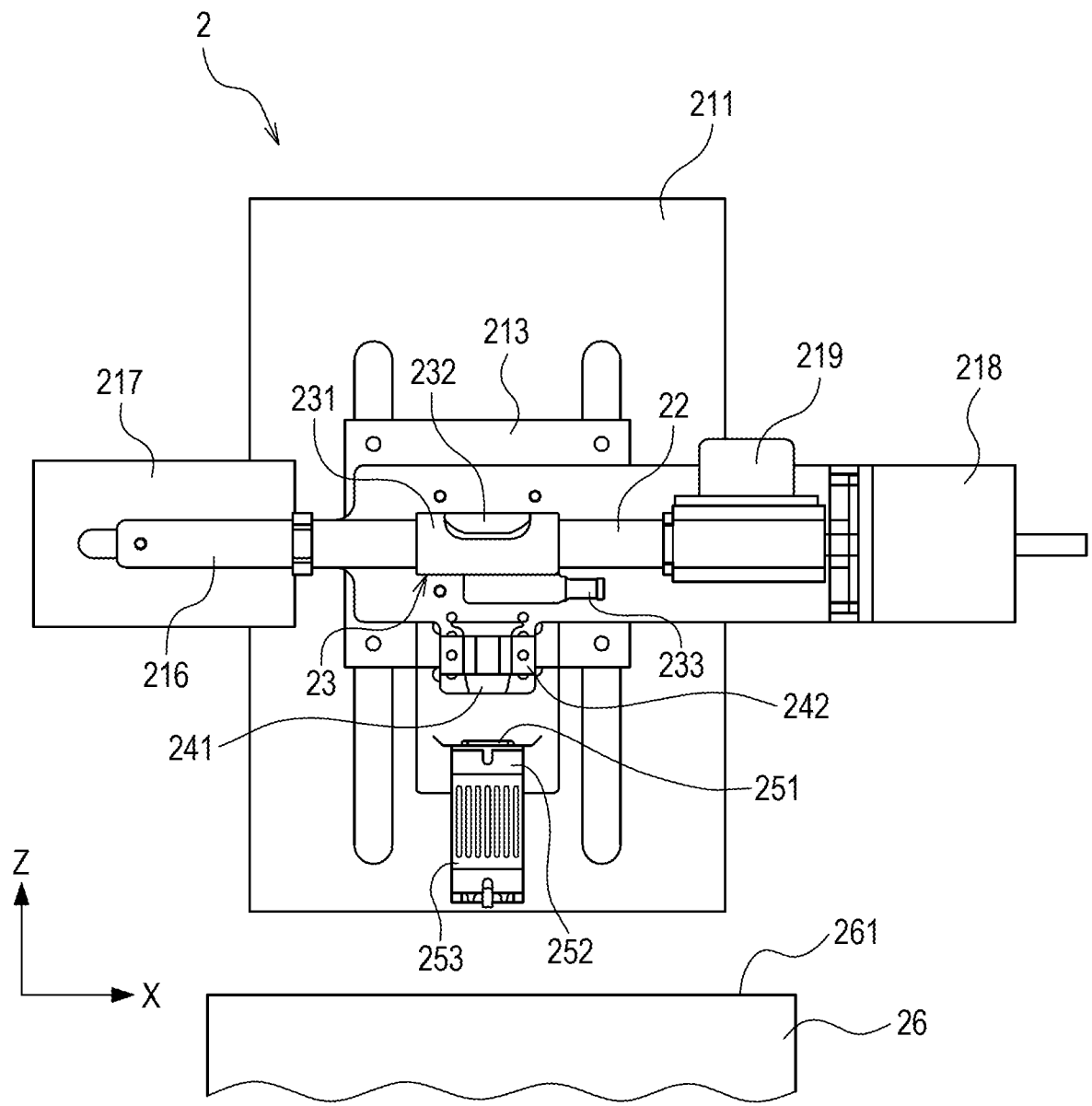
FIG. 3 is a front view showing a sowing apparatus.

As shown in FIG. 2, the grafting member 5 is formed of an elastically deformable resin material, such as silicone rubber. In the present embodiment, the grafting member 5 is formed of polydimethylsiloxane (PDMS). The grafting member 5 has a rectangular plate shape. In the present embodiment, the grafting member 5 has a size of 20 mm in length, 2 mm in width, and 1 mm in thickness.

The grafting member 5 comprises a first main surface 51, which is a main surface on one side in a thickness direction and a second main surface 52, which is a main surface on the other side in the thickness direction. The first main surface 51 of the grafting member 5 comprises plant holders 53 each configured to hold a plant for grafting. The plant holders 53 are arranged a specified distance apart from each other along a length direction of the grafting member 5. Although the number of the plant holders 53 in the present embodiment is four, the plant holders 53 are reduced in number in FIG. 2.

Each of the plant holders 53 is recessed from the first main surface 51 of the grafting member 5 in the thickness direction. Each of the plant holders 53 is open, in the first main surface 51 of the grafting member 5, toward the one side in the thickness direction of the grafting member 5. Each of the plant holders 53 comprises a seed storage section 54, a stem storage section 55, and a root storage section 56.

The seed storage section 54 is a section in which a seed of a plant for grafting is placed and stored, and the seed is germinated. The seed storage section 54 has a circular shape recessed from the first main surface 51 of the grafting member 5 in the thickness direction. The seed storage section 54 has an inner diameter adjusted to a size that allows a water-absorbing seed to rotate when germinating.

The stem storage section 55 is a section to store a part of, or the whole of, a stem of the plant for grafting. The stem storage section 55 is recessed from the first main surface 51 of the grafting member 5 in the thickness direction. The stem storage section 55 is formed linearly from the seed storage section 54 in one width direction of the grafting member 5. One end of the stem storage section 55 opposite to the seed storage section 54 is open toward the one width direction of the grafting member 5. The stem storage section 55 has a width sized to allow passage of a cotyledon of the plant for grafting and also sized to allow holding of a stem of the plant for grafting.

The root storage section 56 is a section to store a part of, or the whole of, a root of the plant for grafting. The root storage section 56 is recessed from the first main surface 51 of the grafting member 5 in the thickness direction. The root storage section 56 is formed linearly from the seed storage section 54 toward the other width direction of the grafting member 5. One end of the root storage section 56 opposite to the seed storage section 54 is open toward the other width direction of the grafting member 5. The root storage section 56 has a width adjusted to a size that allows passage of the root of the plant for grafting.

The first main surface 51 of the grafting member 5 comprises a cutting recess 57 arranged to intersect the plant holder 53. The cutting recess 57 is formed linearly along the length direction of the grafting member 5 so as to be orthogonal to the stem storage section 55 of the plant holder 53. The cutting recess 57 have both open ends along the length direction of the grafting member 5.

The grafting member 5 comprises a first piece 5A, which is a portion on one side of the cutting recess 57 in the width direction of the grafting member 5, and a second piece 5B, which is a portion on the other side of the cutting recess 57 in the width direction of the grafting member 5. The grafting member 5 is configured such that the first piece 5A and the second piece 5B are couplable and separable. The first piece 5A and the second piece 5B may be configured, for example, to be coupled by engaging a convex portion provided to one of the pieces with a concave portion provided to the other one of the pieces.

The grafting member 5 may be adjusted in size depending on a type of seeds of a plant for grafting. For example, in a case of *Arabidopsis thaliana* having a seed diameter of approximately 500 µm, the seed storage section 54 may have an inner diameter of 700 to 1200 µm, the stem storage section 55 and the root storage section 56 may each have a width of 100 to 500 µm, the stem storage section 55 may have a length of 500 to 1500 µm, and the root storage section 56 may have a length of 100 to 1000 µm. In a case of tomato, eggplant, or the like, the seed storage section 54 may have an inner diameter of 3.5 to 7.5 mm, the stem storage section 55 and the root storage section 56 may each have a width of 0.6 to 1.5 mm, the stem storage section 55 may have a length of 5 to 15 mm, and the root storage section 56 may have a length of 0 to 10 mm.

Next, a description will be given of the sowing apparatus 2.

As shown in FIG. 3 to FIG. 6, the sowing apparatus 2 comprises a base section 211. A plate-shaped support 213 is mounted to the base section 211 through four rod-shaped coupling members 212. A swing motor 214 is mounted to the support 213. A swing arm 216 is mounted to the swing motor 214 through a swing shaft 215. The swing arm 216 is rotatable in accordance with rotation of the swing shaft 215 by the swing motor 214.

The swing arm 216 comprises one end to which a balance weight 217 is mounted. The swing arm 216 comprises the other end to which a cylindrical separator tube 22 and a turn motor 218 that is configured to rotate the cylindrical separator tube 22 around its center axis are mounted. The separator tube 22 is tiltable with respect to a horizontal direction by rotation of the swing arm 216. A vibrator 219 to vibrate the separator tube 22 is mounted to the separator tube 22.

Both ends of the separator tube 22 are closed. The separator tube 22 comprises therein a seed container 221 that is a space capable of containing a plurality of seeds 60. The seed container 221 may be configured to contain only one seed 60. At a center part of the separator tube 22, there is provided a seed ejection mechanism (seed ejector) 23 capable of separately taking one seed 60 out of the seed container 221. The seed ejection mechanism 23 may be configured to separately eject a plurality of seeds 60 from the seed container 221.

The seed ejection mechanism 23 comprises a tubular ejection body 231. The ejection body 231 comprises a seed ejection port 232 through which the seed 60 is ejected. The seed ejection port 232 communicates with the seed container 221 through an ejection communication hole 222 of the separator tube 22. The ejection body 231 comprises a seed suction section 233. The seed suction section 233 comprises a vacuum suction port 234 open to outside. The vacuum suction port 234 communicates with the seed container 221 through a seed suction communication hole 235 of the ejection body 231 and a seed suction hole 223 of the separator tube 22. In the separator tube 22, the ejection communication hole 222 and the seed suction hole 223 are provided radially opposite to each other.

A tubular seed ejection guide 241 is arranged under the seed ejection mechanism 23. The seed ejection guide 241 is mounted to the swing arm 216 through a support frame 242. A tubular seed pointer (a seed discharger) 251 is arranged under the seed ejection guide 241. The seed pointer 251 is formed in a funnel shape having a decreasing diameter toward its top. The seed pointer 251 is mounted to the support 213 through a support frame 252. A vibrator 253 to vibrate the seed pointer 251 is mounted to the support frame 252.

Figure 4:
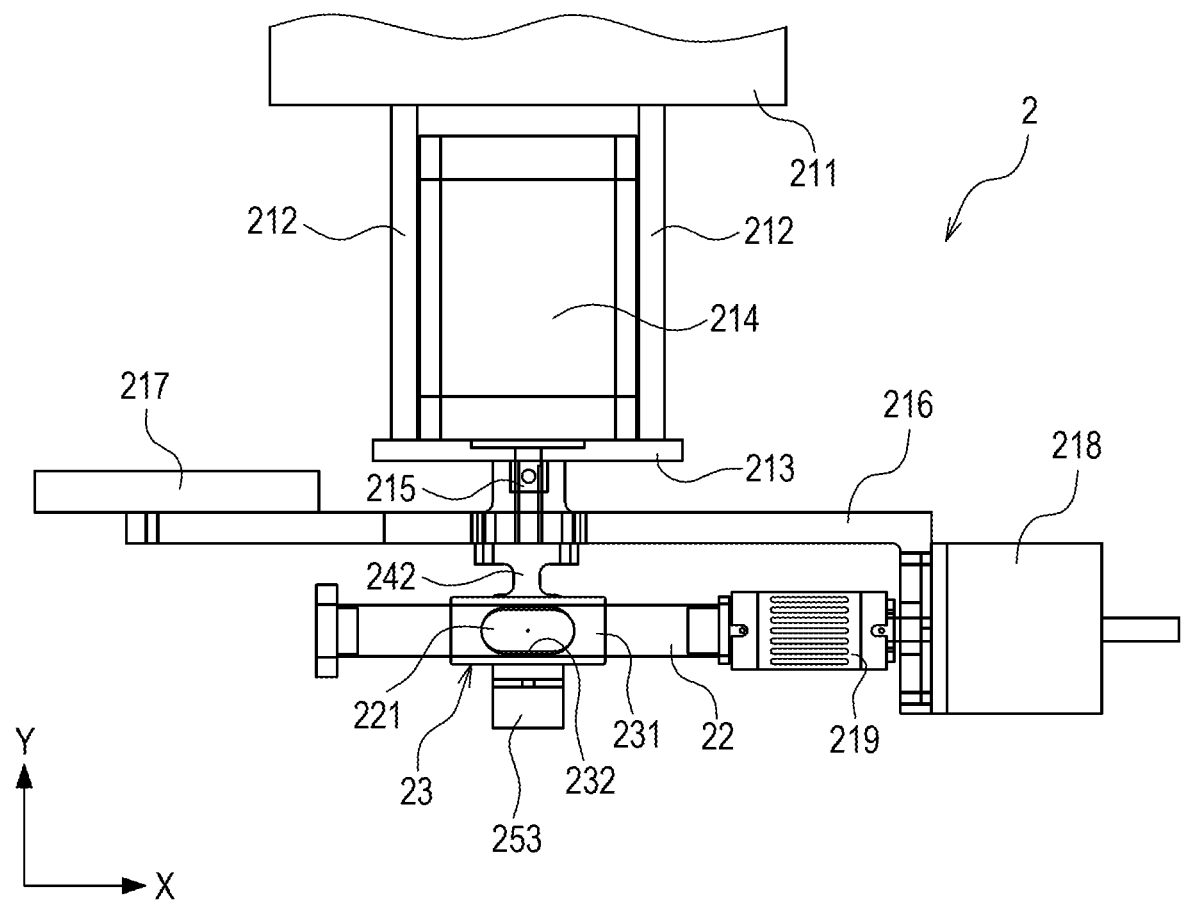
FIG. 4 is a plan view showing the sowing apparatus.
Figure 5:
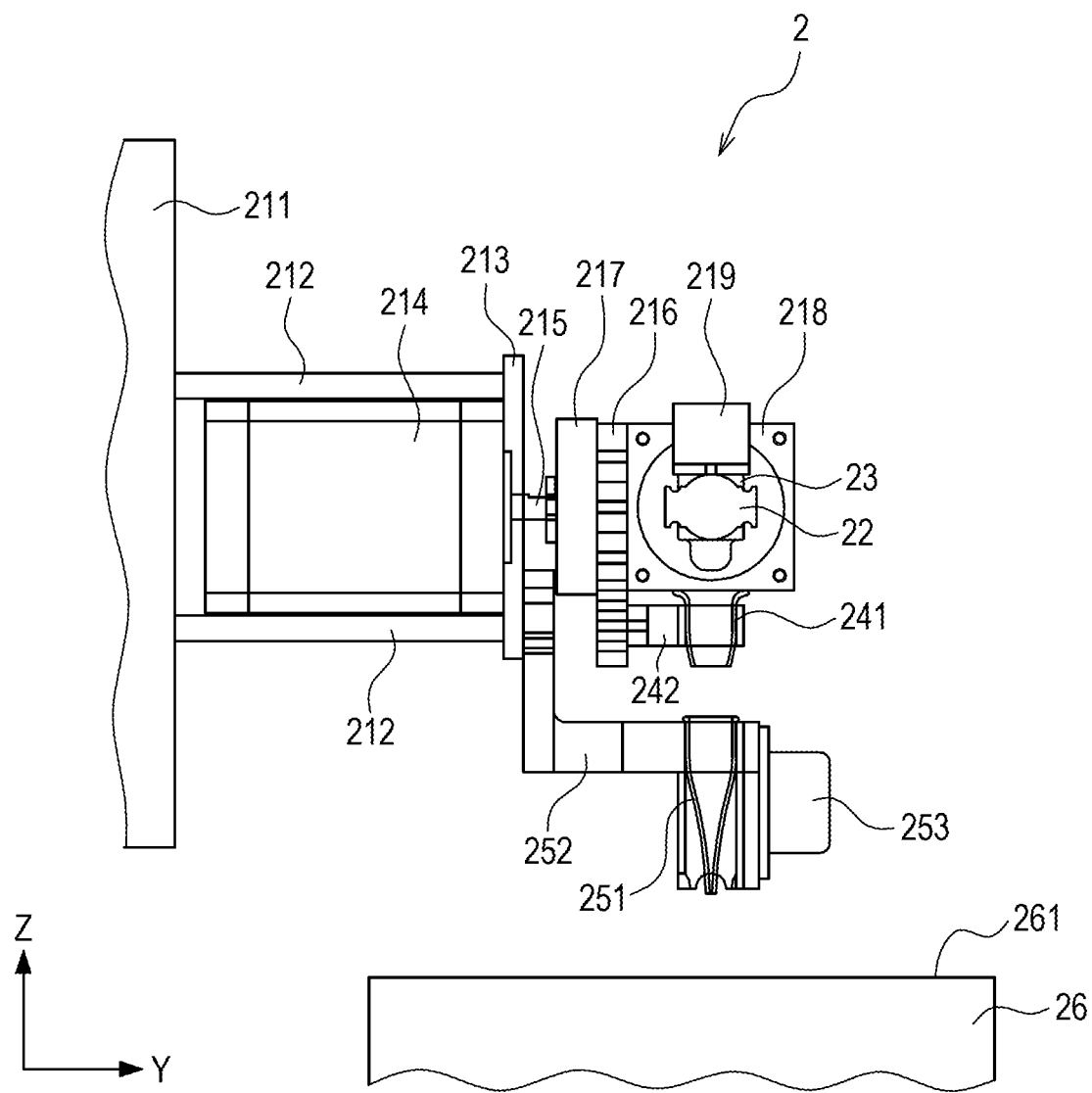
FIG. 5 is a side view showing the sowing apparatus.
Figure 6:
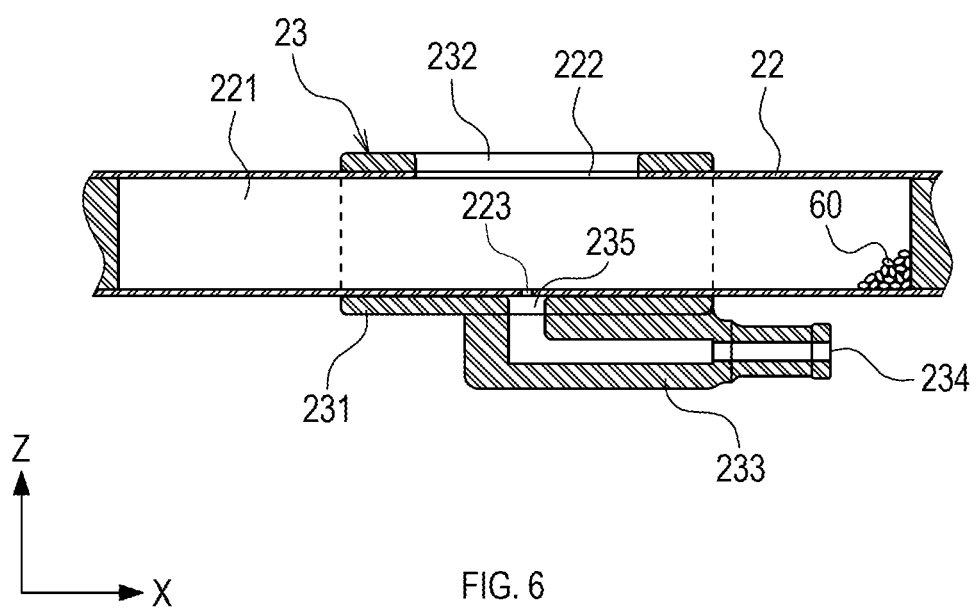
FIG. 6 is a sectional view showing, in an enlarged manner, a seed ejection mechanism in the sowing apparatus.

The sowing apparatus 2 also comprises a first placement section 26 having a first placement surface 261 on which the grafting member 5 is placed. The first placement section 26 is configured to be movable along a horizontal direction (an X-axis direction, a Y-axis direction) and a vertical direction (a Z-axis direction). The first placement section 26 is arranged under the seed pointer 251. In FIG. 4, the first placement section 26 is not shown.

Next, a description will be given of the cutting device 3.

Figure 7:
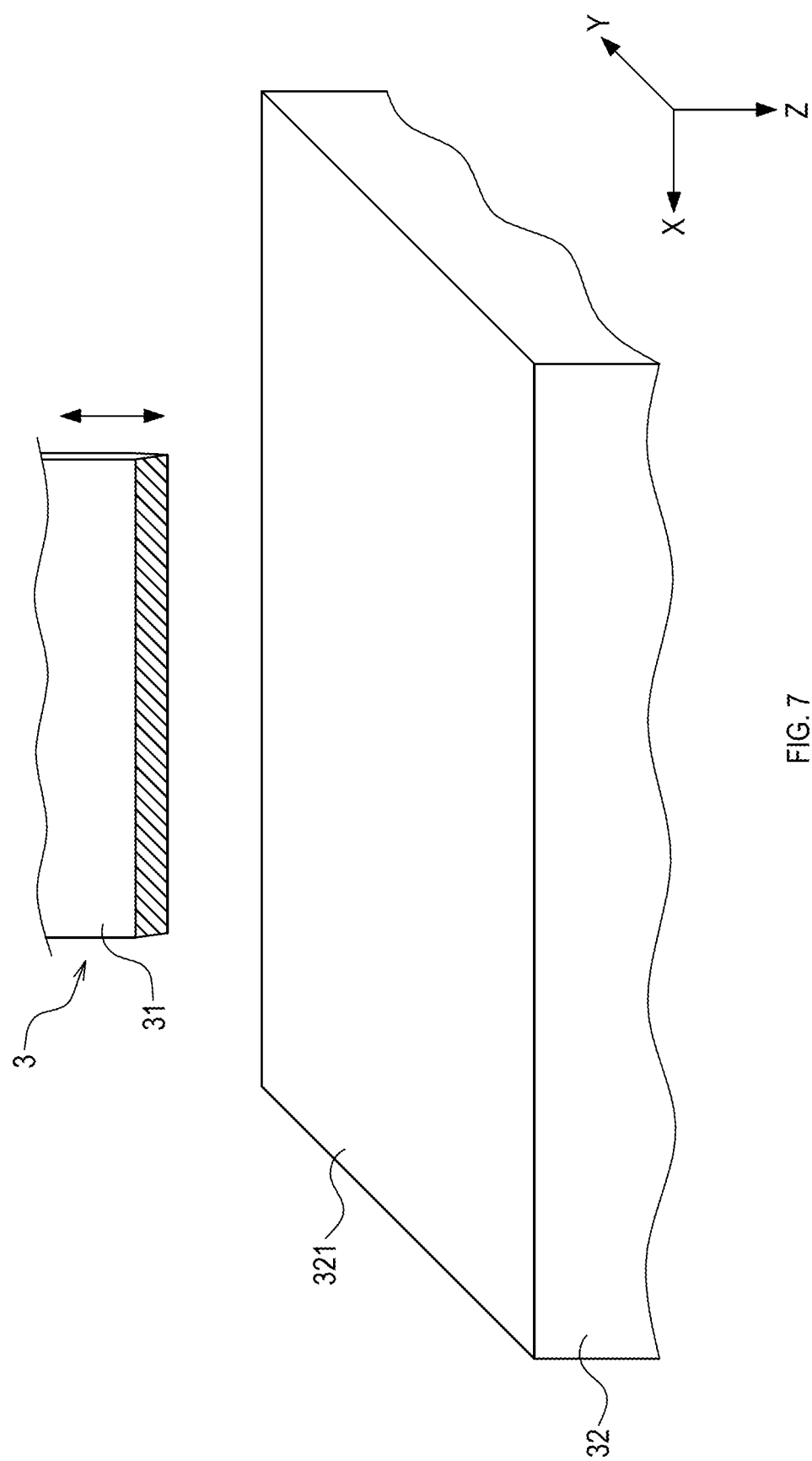
FIG. 7 is a perspective view showing a cutter.

As shown in FIG. 7, the cutting device 3 comprises a cutting blade 31 to cut a stem of a plant for grafting and a second placement section 32 having a second placement surface 321 on which the grafting member 5 is placed. The cutting blade 31 is supported by a support (not shown) to support the cutting blade 31, and is configured to be movable along the vertical direction (the Z-axis direction). The cutting blade 31 may be configured to be movable along a direction other than the vertical direction, such as the horizontal direction (the X-axis direction, the Y-axis direction). The second placement section 32 is configured to be movable along the horizontal direction (the X-axis direction, the Y-axis direction) and the vertical direction (the Z-axis direction).

Next, a description will be given of the joining member 4.

Figure 8:
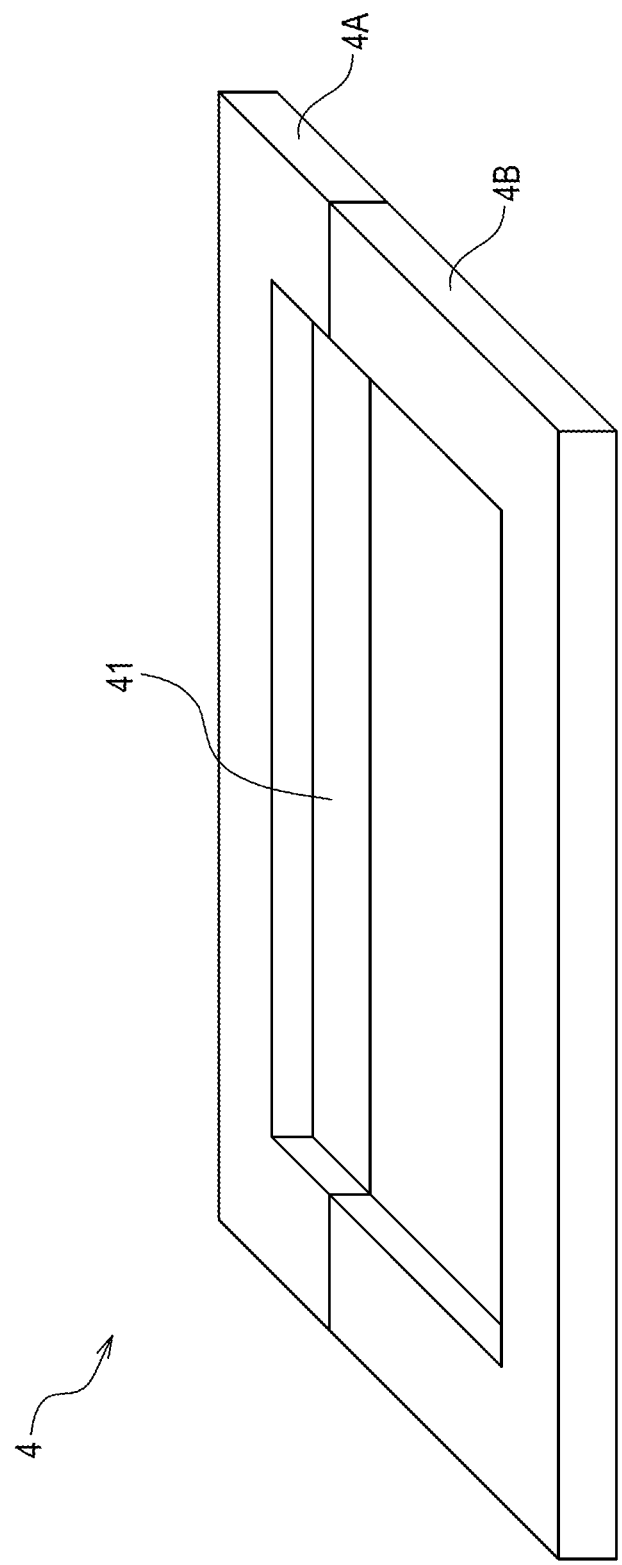
FIG. 8 is a perspective view showing a joining member.

As shown in FIG. 8, the joining member 4 is a long plate-shaped member to hold the grafting member 5. The joining member 4 comprises a recessed grafting member holder 41 to hold the grafting member 5. The joining member 4 comprises a first holder (joining holder) 4A to hold the first piece 5A of the grafting member 5 and a second holder (joining holder) 4B to hold the second piece 5B of the grafting member 5. The joining member 4 is configured such that the first holder 4A and the second holder 4B are couplable and splittable. The first holder 4A and the second holder 4B may be configured to be coupled, for example, by engaging a convex portion provided to one of the holders with a concave portion provided to the other one. Although the joining member 4 is configured with two parts, which are the first holder 4A and the second holder 4B, the number of parts configuring the joining member 4 is not limited. The grafting member holder 41 is not limited to a recessed shape, and various forms that allow holding of the grafting member 5 may be employed.

Figure 20:
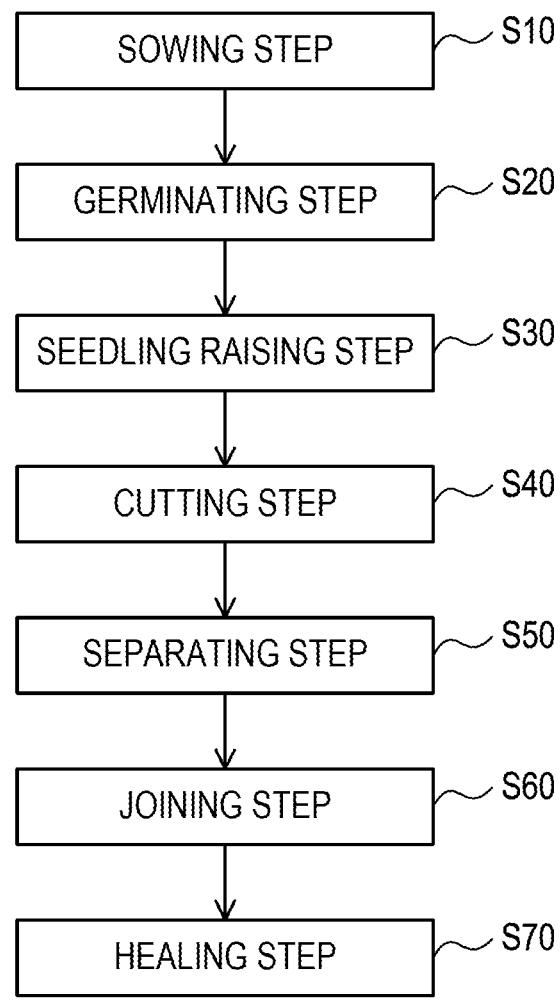
FIG. 20 is a flowchart showing a grafted seedling production method.
Figure 21:
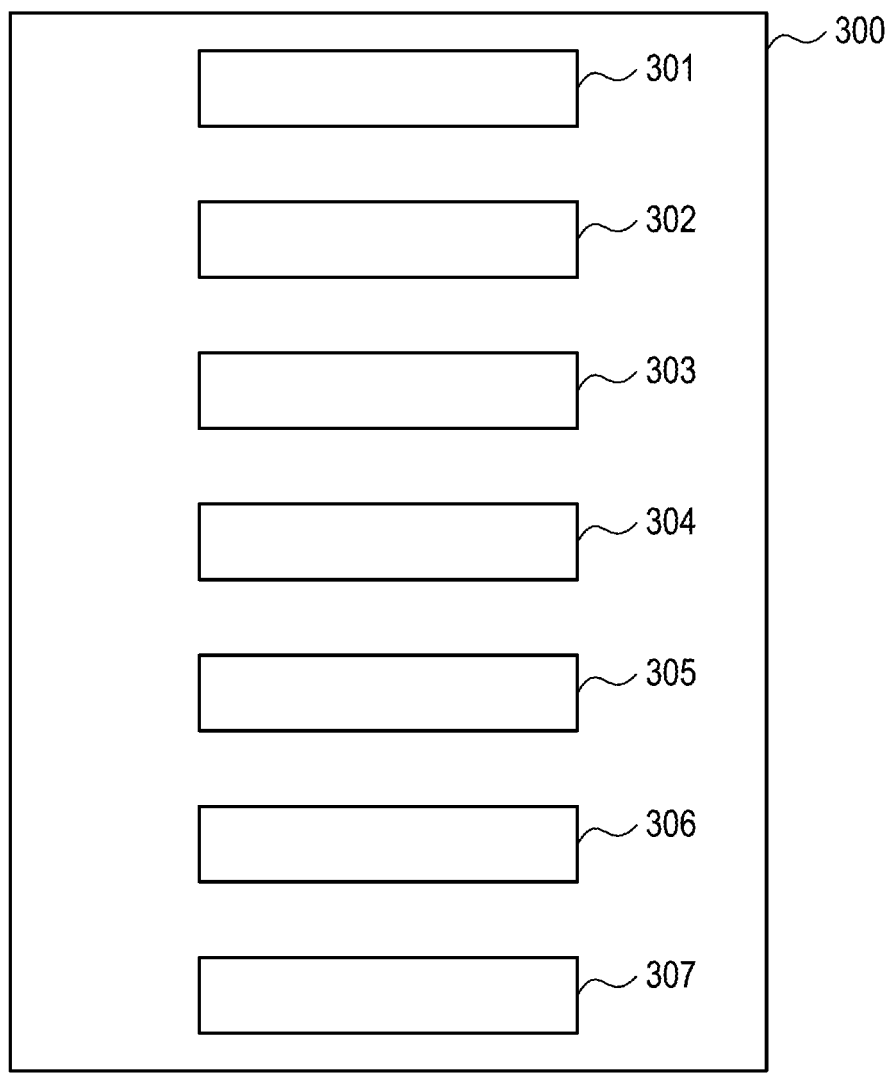
FIG. 21 is a block diagram showing a grafted seedling production system.

Next, descriptions will be given of a grafted seedling production method using the grafting apparatus 1 as shown in FIG. 20, and a grafted seedling production system 300 as shown in FIG. 21.

As shown in FIG. 20, the grafted seedling production method comprises a sowing step S10, a germinating step S20, a seedling raising step S30, a cutting step S40, a separating step S50, a joining step S60, and a healing step S70.

As shown in FIG. 21, the grafted seedling production system 300 comprises a sower 301, a germinator 302, a seedling raiser 303, a cutter 304, a separator 305, a joiner 306, and a healer 307. The sower 301 corresponds to the sowing apparatus 2. The cutter 304 corresponds to the cutting device 3. The joiner 306 corresponds to the joining member 4.

Figure 9:
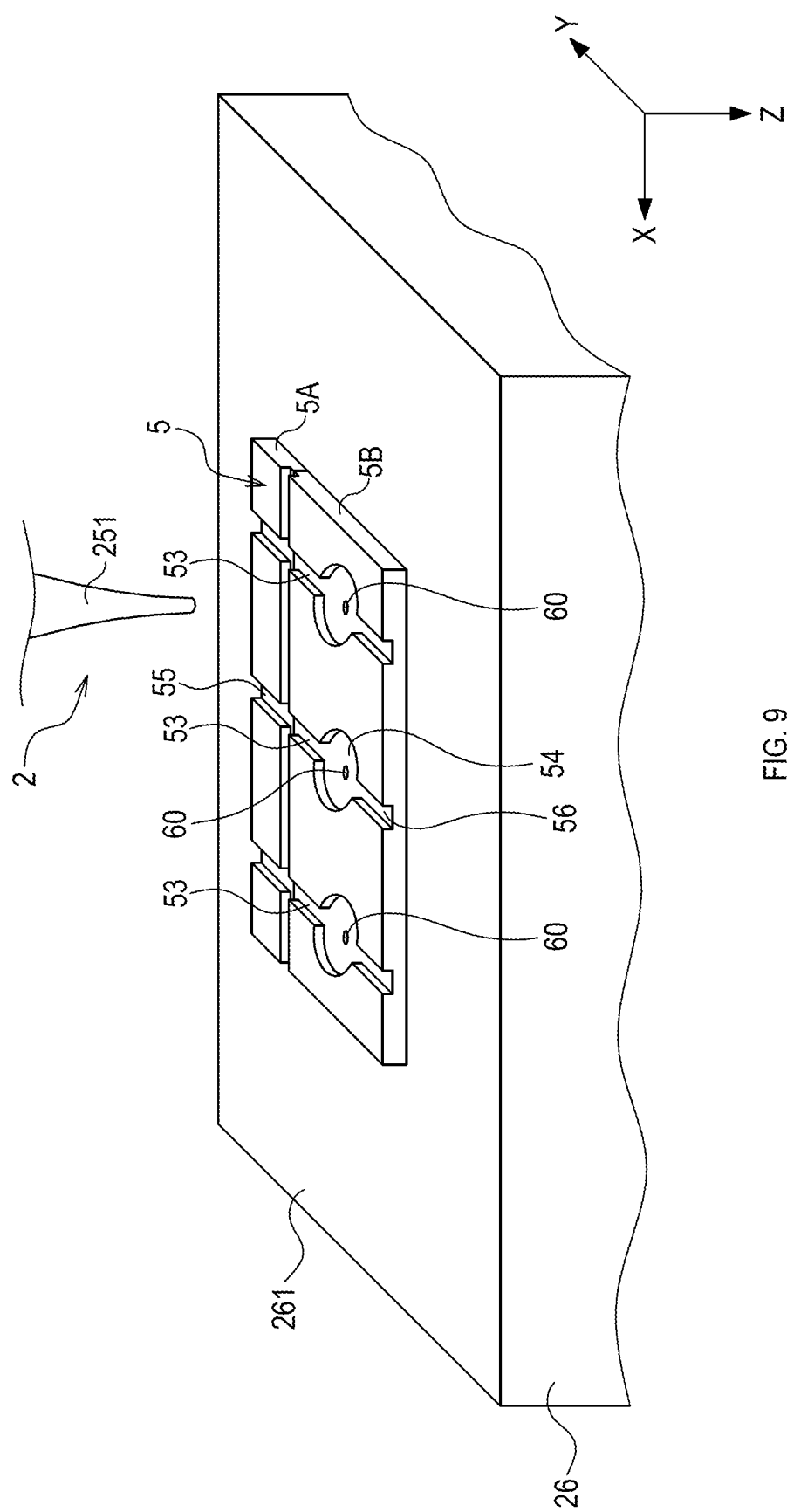
FIG. 9 is an explanatory view showing a sowing operation.

First, as shown in FIG. 9, sowing of seeds 60 of a plant for grafting is performed in the plant holders 53 of the grafting member 5 using the sowing apparatus 2 (see FIG. 3 to FIG. 6). Specifically, the grafting member 5 is placed in a specified position (coordinate position) on the first placement surface 261 of the first placement section 26 of the sowing apparatus 2. Placement of the grafting member 5 may be performed manually, or may be performed in a partially or entirely mechanical and automatic manner (that is, semi-automatically or full-automatically). For example, in a case of mechanical and automatic placement of the grafting member 5, it may be configured such that the grafting member 5 is conveyed mechanically and automatically to the first placement section 26 of the sowing apparatus 2 from outside the sowing apparatus 2. Automatic sowing facilitates handling of tiny seeds.

Figure 10A:
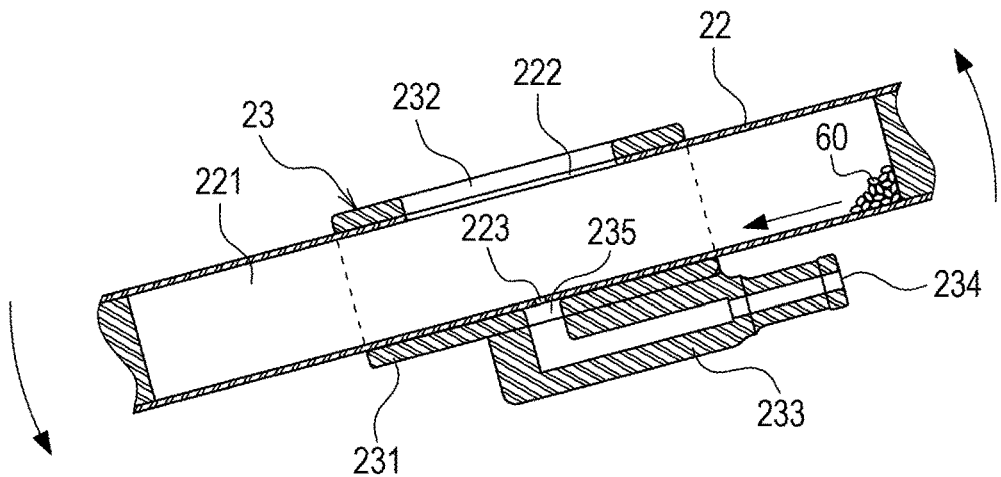
FIGS. 10A-10C are explanatory views showing a process of taking a seed out of the seed ejection mechanism.
Figure 10B:
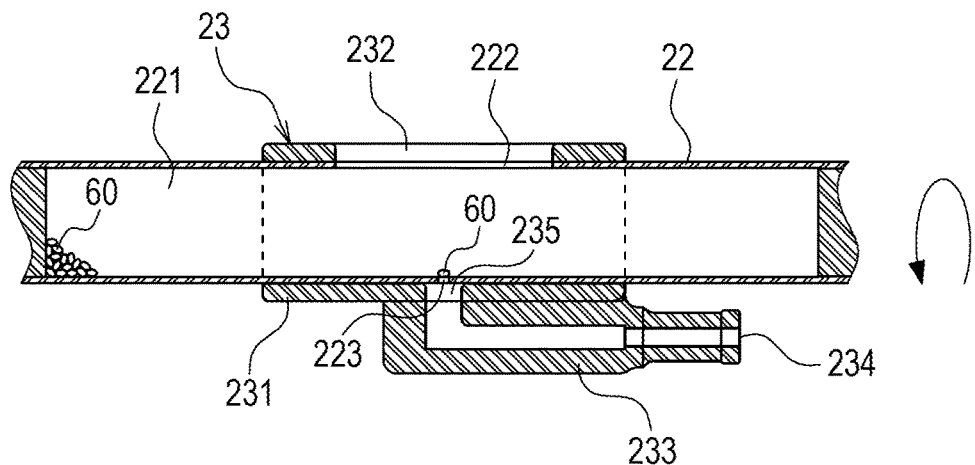

Subsequently, as shown in FIG. 10A, vacuum suction is performed from the vacuum suction port 234 of the sowing apparatus 2, to thereby cause a negative pressure state at an opposite side of the seed suction hole 223 of the separator tube 22 (on a seed suction communication hole 235 side), and the swing arm 216 is rotated to tilt the separator tube 22 relative to the horizontal direction. Thereafter, as shown in FIG. 10B, the separator tube 22 is returned to a horizontal state, resulting in vacuum suction of one seed 60 in the seed container 221 at the seed suction hole 223. In this case, vibrating the separator tube 22 by the vibrator 219 inhibits vacuum suction of a plurality of seeds 60 in the seed container 221 at the seed suction hole 223. Also, if an inner surface of the seed container 221 is not a smooth surface but a satin-finish surface having fine convexes and concaves, vibrating the separator tube 22 by the vibrator 219 can reduce aggregation of the seeds 60.

Figure 10C:
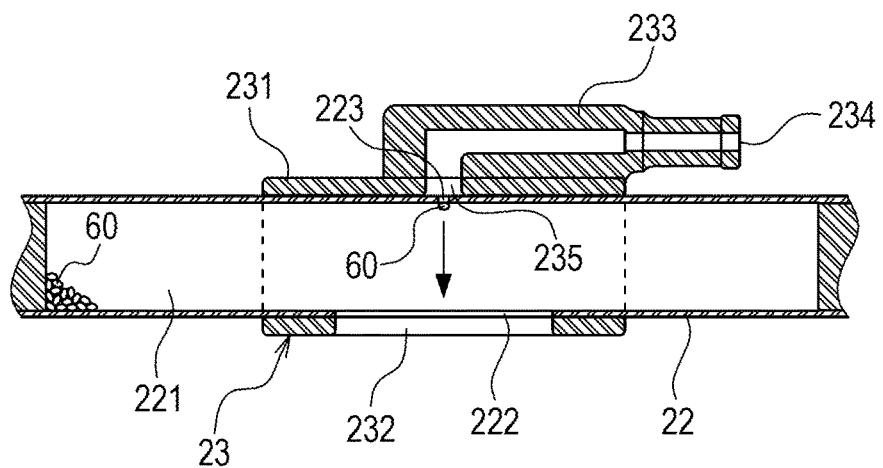

Subsequently, as shown in FIG. 10C, while the one seed 60 is vacuum suctioned at the seed suction hole 223, the separator tube 22 is rotated by the turn motor 218 by 180° around the center axis, to thereby make the seed ejection port 232 open downward. Then, a positive pressure is applied from a back side of the seed suction hole 223 (from the seed suction communication hole 235 side), thereby releasing the seed 60, which is vacuum suctioned at the seed suction hole 223, from the seed suction hole 223. In order to promote release of the seed 60, the separator tube 22 may be vibrated by the vibrator 219. The released seed 60 passes through the seed ejection guide 241 and further passes through and falls down the seed pointer 251, and then is sown in the seed storage section 54 in the plant holder 53 of the grafting member 5. In order to promote falling of the seed 60, the seed pointer 251 may be vibrated by the vibrator 253.

Subsequently, while the seed pointer 251 of the sowing apparatus 2 is in a fixed a position, the grafting member 5 is moved to a specified position (a coordinate position), and the same sowing operation as described above is performed, to sow the seeds 60 in all of the seed storage sections 54 of the plant holders 53 of the grafting member 5. The sowing operation described above may be performed manually, or may be performed in a partially or entirely mechanical and automatic manner (that is, semi-automatically or full-automatically). Also, the sowing operation described above may be performed by moving the seed pointer 251 of the sowing apparatus 2 while the grafting member 5 is in a fixed a position, or may be performed by moving both of the grafting member 5 and the seed pointer 251 of the sowing apparatus 2. In a case of moving the grafting member 5, the grafting member 5 may be moved together with the first placement section 26 of the sowing apparatus 2, or the grafting member 5 may be moved singly. Also, operation timings of respective control elements during the sowing operation may be controllable, for example, by an electronic control unit (ECU).

Subsequently, the grafting member 5, in which the seeds 60 are sown in all of the seed storage sections 54 of the plant holders 53, is taken out of the sowing apparatus 2. The takeout of the grafting member 5 may be performed manually, or may be performed in a partially or entirely mechanical and automatic manner (that is, semi-automatically or full-automatically). For example, in a case of taking out the grafting member 5 mechanically and automatically, a storing section (not shown) to store the grafting members 5 outside the sowing apparatus 2 may be provided to allow conveyance of the grafting members 5 from the sowing apparatus 2 to the storing section in a mechanical and automatic manner.

Figures 11A, 11B, 11C, 11D:
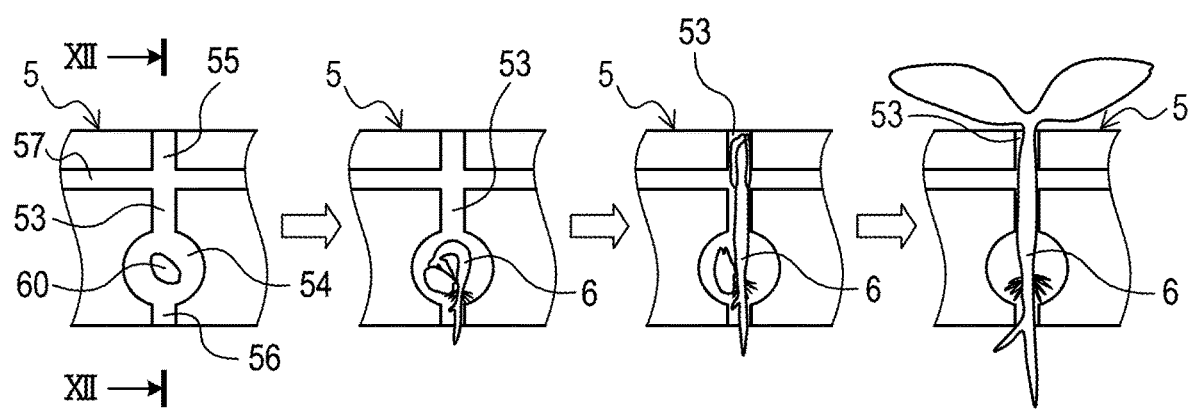
FIGS. 11A-11D are explanatory views showing a process of raising a seedling of a plant for grafting in a plant holder of the grafting member.
Figure 12:
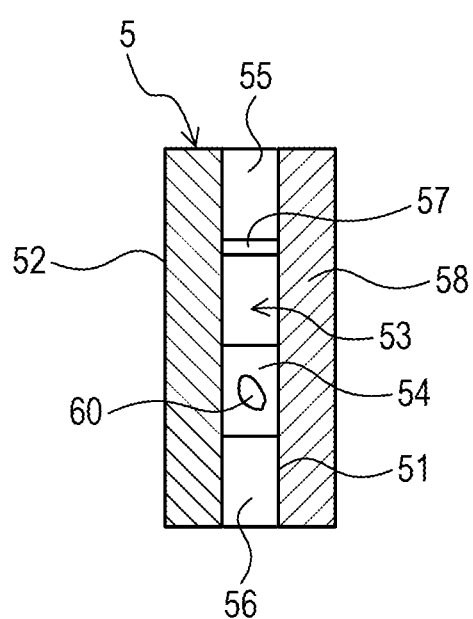
FIG. 12 is a sectional view taken along a line XII-XII in FIG. 11A.

Subsequently, as shown in FIG. 12, a plant growth medium 58 is attached, via a membrane filter or the like, to the first main surface 51 of the grafting member 5 in which the seed 60 is stored in the seed storage section 54 of the plant holder 53. Thereafter, as shown in FIG. 11A, the grafting member 5 is made to stand upright together with the plant growth medium 58, and kept in a dark place to raise seedlings until cotyledons reach close to one end (an open end) of the stem storage section 55.

After the grafting member 5 is kept in a dark place to raise seedlings, as shown in FIG. 11B, the seed 60 sown in the seed storage section 54 germinates, and as shown in FIG. 11C, a stem (a hypocotyl) of the plant for grafting 6 extends in the stem storage section 55 without development of cotyledons, and a root of the plant for grafting 6 extends in the root storage section 56. This step is performed by the germinator 302 in the grafted seedling production system 300. When the plant for grafting 6 reaches close to the one end of the stem storage section 55 without development of the cotyledons, then the seedlings are raised in a light place until the cotyledons develop. As shown in FIG. 11D, the cotyledons of the plant for grafting 6 develop after the grafting member 5 is kept in a light place to raise seedlings. This step is performed by a seedling raising device 303 in the grafted seedling production system 300. Raising seedlings of the plant for grafting 6 may be performed with the grafting member 5 taken out of the grafting apparatus 1, or may be performed with the grafting member 5 kept in the grafting apparatus 1. In a case of raising seedlings of the plant for grafting 6 with the grafting member 5 taken out of the grafting apparatus 1, the grafting member 5 is returned into the grafting apparatus 1 after the seedlings are raised.

FIG. 12 shows a state where the grafting member 5 is made to stand upright together with the plant growth medium 58. The plant growth medium 58 is arranged to cover the first main surface 51 of the grafting member 5 (so as to close opening areas of the seed storage section 54, the stem storage section 55, and the root storage section 56). Accordingly, a direction of supplying seeds, or a direction of supplying the plant growth medium 58 that is necessary for germination and growth of the plant, and a direction of plant growth are mutually different (perpendicular to each other), resulting in a configuration with improved workability. The reason for making the grafting member 5 stand upright together with the plant growth medium 58 is that plants grow along a gravity direction. Also, the reason for raising seedlings in a dark place is to extend stems to a certain extent without development of cotyledons.

Figure 13:
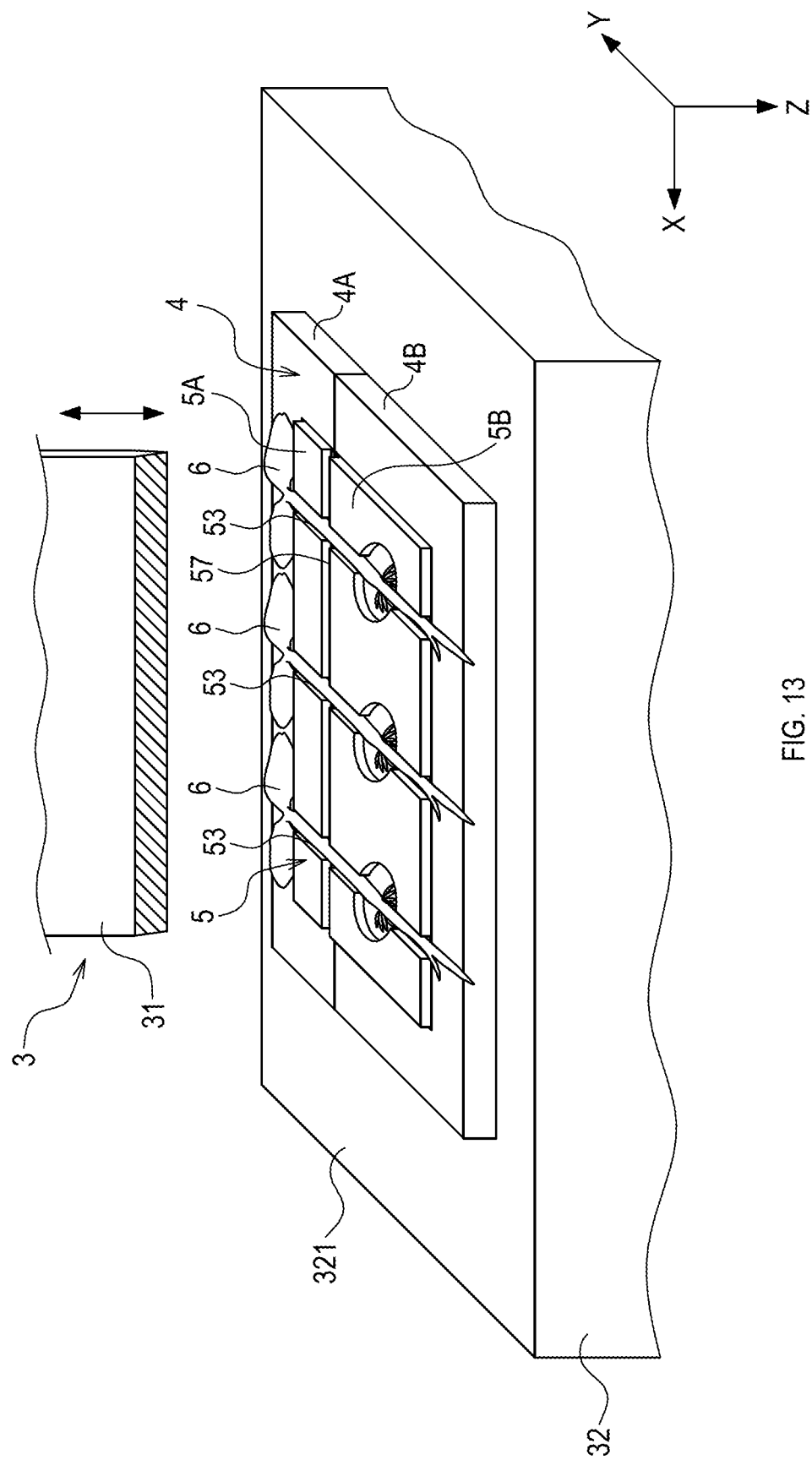
FIG. 13 is an explanatory view showing a cutting operation.

Subsequently, as shown in FIG. 13, the stem of the plant for grafting 6 held by the plant holder 53 of the grafting member 5 is cut using the cutting device 3 (see FIG. 7). Specifically, the grafting member 5 is placed in a specified position (a coordinate position) on the second placement surface 321 of the second placement section 32 of the cutting device 3. The plant for grafting 6 that is held by the plant holder 53 of the grafting member 5 is laid horizontally. In the present embodiment, the grafting member 5 is held by the joining member 4, in order to improve operability, for example, in handling and positioning. The grafting member 5 is arranged in the grafting member holder 41 of the joining member 4. Placement of the grafting member 5 may be performed manually, or may be performed in a partially or entirely mechanical and automatic manner (that is, semi-automatically or full-automatically). For example, in a case of mechanical and automatic placement of the grafting member 5, it may be configured such that the grafting member 5 is conveyed from outside of the cutting device 3 to the second placement section 32 of the cutting device 3 in a mechanical and automatic manner.

Subsequently, the cutting blade 31 of the cutting device 3 is moved (reciprocated) along the cutting recess 57 of the grafting member 5 in the vertical direction (the Z-axis direction). In this case, the cutting blade 31 of the cutting device 3 is moved (reciprocated) in the cutting recess 57 of the grafting member 5 in the vertical direction (the Z-axis direction) to cut only the stem of the plant for grafting 6. Also, the stem of the plant for grafting 6 is cut along a direction substantially orthogonal to its axial direction. To inhibit the plant for grafting 6, which has been cut by the cutting blade 31, from attaching to the cutting blade 31 and slipping out of the plant holder 53, a retaining member or the like to retain the plant for grafting 6 not to move in a moving direction of the cutting blade 31 may be provided to reduce slipout of the plant for grafting 6. In this manner, the stems of the plants for grafting 6 held in the plant holders 53 of the grafting member 5 are cut at the same time.

Cutting operation described above may be performed manually, or may be performed in a partially or entirely mechanical and automatic manner (that is, semi-automatically or full-automatically). The cutting operation may be performed by moving the grafting member 5 while the cutting blade 31 of the cutting device 3 is in a fixed position, or by moving both of the grafting member 5 (the joining member 4 holding the grafting member 5) and the cutting blade 31 of the cutting device 3. In a case of moving the grafting member 5, the grafting member 5 may be moved together with the second placement section 32 of the cutting device 3, or only the grafting member 5 may be moved. Operation timings of respective control elements during the cutting operation may be controllable, for example, by an electronic control unit (ECU). Also, in the cutting operation described above, a direction of the grafting member 5, a direction of the plant for grafting 6 held by the plant holder 53 of the grafting member 5, a cutting direction by the cutting blade 31, or the like may be freely changed.

Figure 14A:
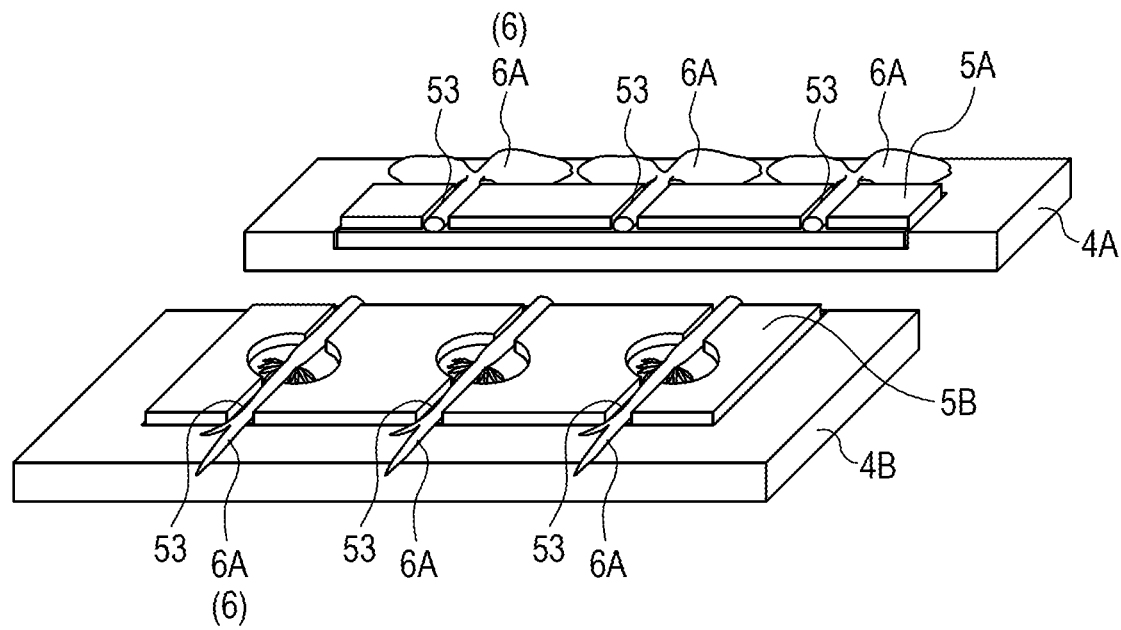
FIG. 14A is an explanatory view showing cut scion plants.

In the present embodiment, as shown in FIG. 14A, after cutting the stem of the plant for grafting 6 that is to be a scion (a scion plant 6A), the grafting member 5 is split into the first piece 5A to hold a cotyledon part of the scion plant 6A and the second piece 5B to hold a root part of the scion plant 6A. At the same time, the joining member 4 is split into the first holder 4A holding the first piece 5A and the second holder 4B holding the second piece 5B. The second holder 4B, the second piece 5B held by the second holder 4B, and the root part of the scion plant 6A held by the second piece 5B become unnecessary.

Figure 14B:
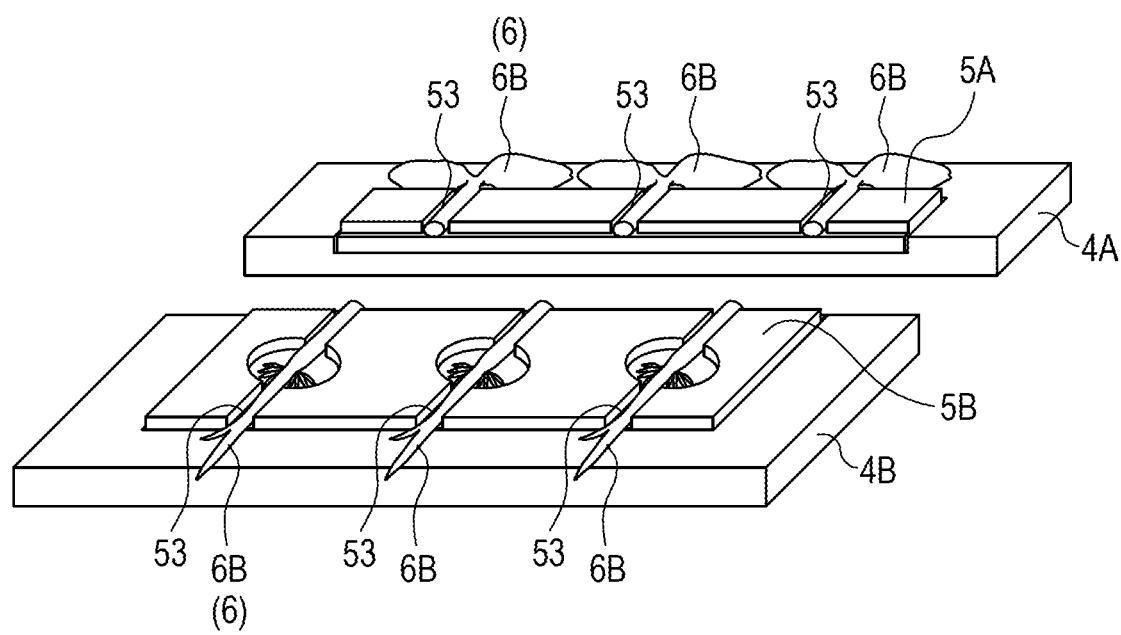
FIG. 14B is an explanatory view showing cut rootstock plants.

As shown in FIG. 14B, after cutting the stem of the plant for grafting 6 that is to be a rootstock (a rootstock plant 6B), the grafting member 5 is split into the first piece 5A to hold a cotyledon part of the rootstock plant 6B and the second piece 5B to hold a root part of the rootstock plant 6B. At the same time, the joining member 4 is split into the first holder 4A holding the first piece 5A and the second holder 4B holding the second piece 5B. The first holder 4A, the first piece 5A held by the first holder 4A, and the cotyledon part of the rootstock plant 6B held by the first piece 5A become unnecessary.

The first holder 4A and the second holder 4B split from each other are separated by the separator 305 in the grafted seedling production system 300. Separation may be performed manually, or may be performed in a partially or entirely mechanical and automatic manner (that is, semi-automatically or full-automatically). For the separator 305 that automatically separates the first holder 4A and the second holder 4B, for example, a separating device 10 shown in FIG. 22A may be employed.

The separating device 10 comprises a base 11, a slide portion 12, and a guide portion 13. The slide portion 12 slides on the base 11 toward the guide portion 13. The guide portion 13 comprises two guide surfaces 13A, 13B each orthogonal to a surface of the base 11. The two guide surfaces 13A, 13B are arranged in a wedge shape having mutually coupled ends adjacent to the slide portion 12 and mutually separating ends toward a direction opposite to the slide portion 12.

As shown in FIG. 22A, the joining member 4 is arranged on the base 11 in such a position that a split surface between the first holder 4A and the second holder 4B is parallel to a sliding direction, and that a virtual surface extending from the split surface includes a coupling point of the guide surfaces 13A, 13B. In such state, when the slide portion 12 is slid toward the guide portion 13, then, as shown in FIG. 22B, the first holder 4A abuts the guide surface 13A and moves upward in the figure, and the second holder 4B abuts the guide surface 13B and moves downward in the figure. As a result, the first holder 4A and the second holder 4B are separated along a direction orthogonal to the split surface.

Figure 15A:
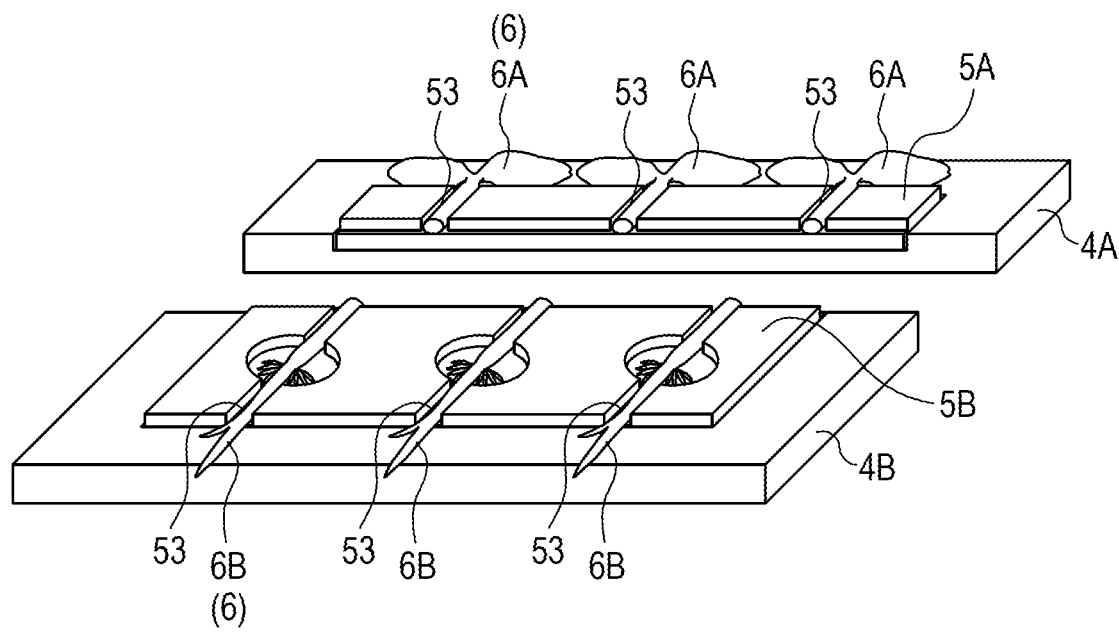
FIGS. 15A and 15B are explanatory views showing a joining operation.

Subsequently, as shown in FIG. 15A, the first holder 4A holding the first piece 5A that is holding the cotyledon part of the scion plant 6A, and the second holder 4B holding the first piece 5A that is holding the cotyledon part of the rootstock plant 6B are prepared. Then, the first holder 4A and the second holder 4B are joined. In this case, the first holder 4A and the second holder 4B may be coupled by, for example, engaging a convex portion provided to one of the first holder 4A and the second holder 4B with a concave portion provided to the other one. Alternatively, the joining may be performed through another member. Also, the first piece 5A and the second piece 5B may be coupled by, for example, engaging a convex portion provided to one of the first holder 4A and the second holder 4B with a concave portion provided to the other one. Alternatively, the first piece 5A and the second piece 5B may be joined using a dedicated jig or the like.

The joining of the first holder 4A and the second holder 4B may be performed automatically, for example, by using a joining device 100 shown in FIG. 23A. The joining device 100 comprises a base 101, a slide portion 102, a buffer 103, a side wall 104, and a block 105.

The slide portion 102 slides on the base 101 toward the buffer 103. The buffer 103 is configured to be movable in a sliding direction of the slide portion 102. The buffer 103 has an elastic force that acts in the sliding direction by a spring. The side wall 104 extends along the sliding direction. The block 105 is arranged to be apart from the side wall 104 along the sliding direction.

As shown in FIG. 23A, the first holder 4A and the second holder 4B are arranged on the base 101 with respective cut surfaces facing each other such that a joining direction is consistent with the sliding direction of the slide portion 102. As shown in FIG. 23B, sliding of the slide portion 102 causes the first holder 4A and the second holder 4B to be joined between the slide portion 102 and the buffer 103. The first holder 4A and the second holder 4B after being joined are further pushed in a direction perpendicular to the sliding direction of the slide portion 102, to be discharged into a space between the side wall 104 and the block 105.

Figure 15B:
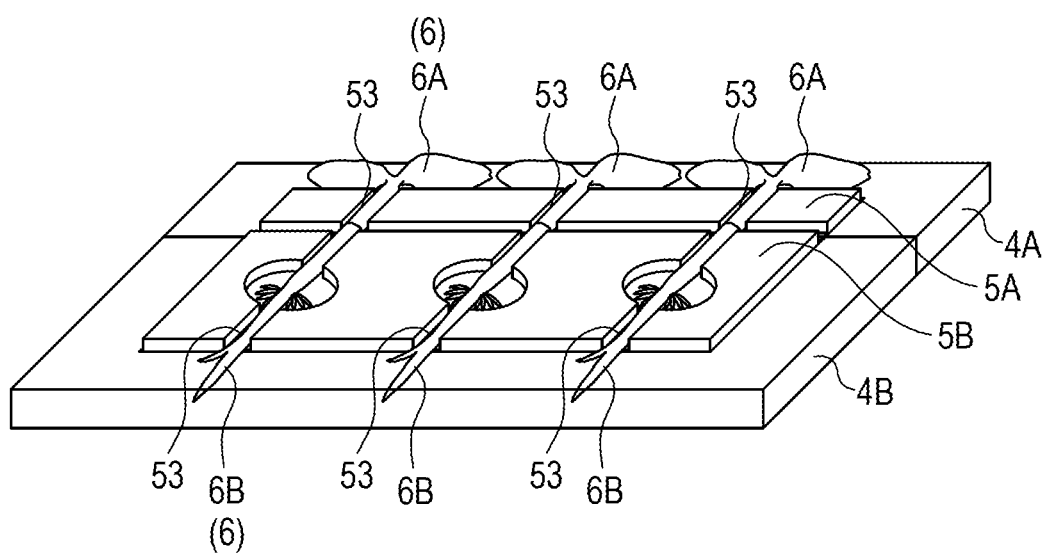

As a result, as shown in FIG. 15B, a cut surface of the stem of the scion plant 6A and a cut surface of the stem of the rootstock plant 6B are brought into abutment (contact). Subsequently, in a state where the cut surface of the stem of the scion plant 6A and the cut surface of the stem of the rootstock plant 6B abut (contact) each other, seedling raising is performed in a light place (weak light). In other words, healing is performed. This step is performed by the healer 307 in the grafted seedling production system 300. As a result, the cut surface of the stem of the scion plant 6A and the cut surface of the stem of the rootstock plant 6B are joined, and a grafted seedling is obtained. The cut surface of the stem of the scion plant 6A and the cut surface of the stem of the rootstock plant 6B may be joined by bonding (pressure bonding) or the like.

Subsequently, the first piece 5A and the second piece 5B that are holding the grafted seedling are taken out of the first holder 4A and the second holder 4B. Then, the grafted seedling is taken out of the first piece 5A and the second piece 5B. This allows reuse of the grafting member 5 (the first piece 5A, the second piece 5B) and the joining member 4 (the first holder 4A, the second holder 4B). The joining operation and the takeout operation described above may be performed manually, or may be performed in a partially or entirely mechanical and automatic manner (that is, semi-automatically or full-automatically). Operation timings of respective control elements during the joining operation and the takeout operation may be controllable, for example, by an electronic control unit (ECU). Automation of the cutting operation through the joining operation allows rapid joining of the plant before the cut surfaces of the stems become dry.

Next, a description will be given of operations and effects of the grafting apparatus 1 in the present embodiment.

According to the grafting apparatus 1 of the present embodiment, grafting operation of the plant for grafting 6 is performed using the plate-shaped grafting members 5, and by means of the cutting device 3 and the joining member 4. This allows easy handling of the grafting members 5. Also, the plate-shaped grafting member 5 comprises a plurality of plant holders 53 provided in the first main surface 51. This facilitates holding of the plants for grafting 6, and thus cutting and joining of the plants for grafting 6.

Accordingly, the grafting operation using the grafting members 5 is simplified, improvement in efficiency and accuracy of the grafting operation can be achieved. As a result, improvement in productivity and improvement in quality of the grafted seedling can be achieved. Also, since size adjustment of the grafting members 5 in accordance with a size of the plant for grafting 6 is easy, the grafting operation can be easily performed, for example, for a young plant that is difficult to manually handle.

The cutting device 3 comprises the second placement section 32 with the second placement surface 321 on which the grafting member 5 is placed. This enables easy positioning of the grafting member 5, thereby achieving an accurate arrangement of the grafting member 5 in a specified position. Accordingly, the stem of the plant for grafting 6 held by the plant holder 53 of the grafting members 5 can be cut easily and accurately.

The joining member 4 comprises the first holder 4A and the second holder 4B to hold respective parts of the grafting members 5 that are holding respective parts of the plants for grafting 6 that have been cut by the cutting device 3, and is configured to mutually join the parts of the plants for grafting 6 by joining the respective parts of the grafting members 5 held by the first holder 4A and the second holder 4B. Thus, the respective parts of the plants for grafting 6 that have been cut by the cutting device 3 can be joined easily and accurately.

In the first main surface 51 of the grafting member 5, the plant holder 53 is formed in a recessed shape open toward one side along the thickness direction of the grafting member 5. This facilitates holding of plant for grafting 6 in the recessed plant holder 53, and also facilitates cutting and joining of the plant for grafting 6 in a state where the plant for grafting 6 is held in the recessed plant holder 53.

The grafting member 5 comprises the cutting recess 57 having a recessed shape that is provided in the first main surface 51 so as to intersect the plant holder 53. The cutting device 3 comprises the cutting blade 31 to cut the stem of the plant for grafting 6. The cutting blade 31 moves in the cutting recess 57 of the grafting member 5, thereby cutting the stem of the plant for grafting 6 held in the plant holder 53 of the grafting member 5. Thus, the stem of the plant for grafting 6 held in the plant holder 53 of the grafting member 5 can be cut easily and accurately by the cutting blade.

The grafting apparatus 1 further comprises the sowing apparatus 2 that places the seeds 60 of the plants for grafting in the plant holders 53 of the grafting members 5 arranged in specified positions. This enables easy and accurate placement of the seeds 60 of the plants for grafting in the plant holders 53 of the grafting members 5. Accordingly, in the case of raising seedlings of the plant for grafting 6 in the plant holders 53 of the grafting members 5 as in the present embodiment, the grafting operation using the grafting members 5 is further simplified, resulting in achievement of further improved efficiency and accuracy of the grafting operation.

The sowing apparatus 2 comprises the seed container 221 capable of containing a plurality of seeds 60, the seed ejection mechanism 23 that can eject one seed from the seed container 221, and the seed discharger that discharges the one seed 60 ejected by the seed ejection mechanism to the plant holder 53 of the grafting member 5. Thus, it is possible to easily and surely perform sowing operation of placing the seeds 60 of the plants for grafting in the plant holders 53 of the grafting members 5.

The plant holders 53 of the grafting members 5 each comprise the seed storage section 54 in which the seed 60 is placed, and the sowing apparatus 2 is configured to place the seeds 60 in the seed storage sections 54 of the plant holders 53 of the grafting members 5 arranged in specified positions. Thus, it is possible to place the seeds 60 of the plants for grafting in the plant holders 53 of the grafting members 5 more easily and accurately.

OTHER EMBODIMENTS

It is to be understood that the present disclosure is not at all limited to the above-described embodiment, but may be practiced in various forms within the scope not departing from the present disclosure.

Figure 16:
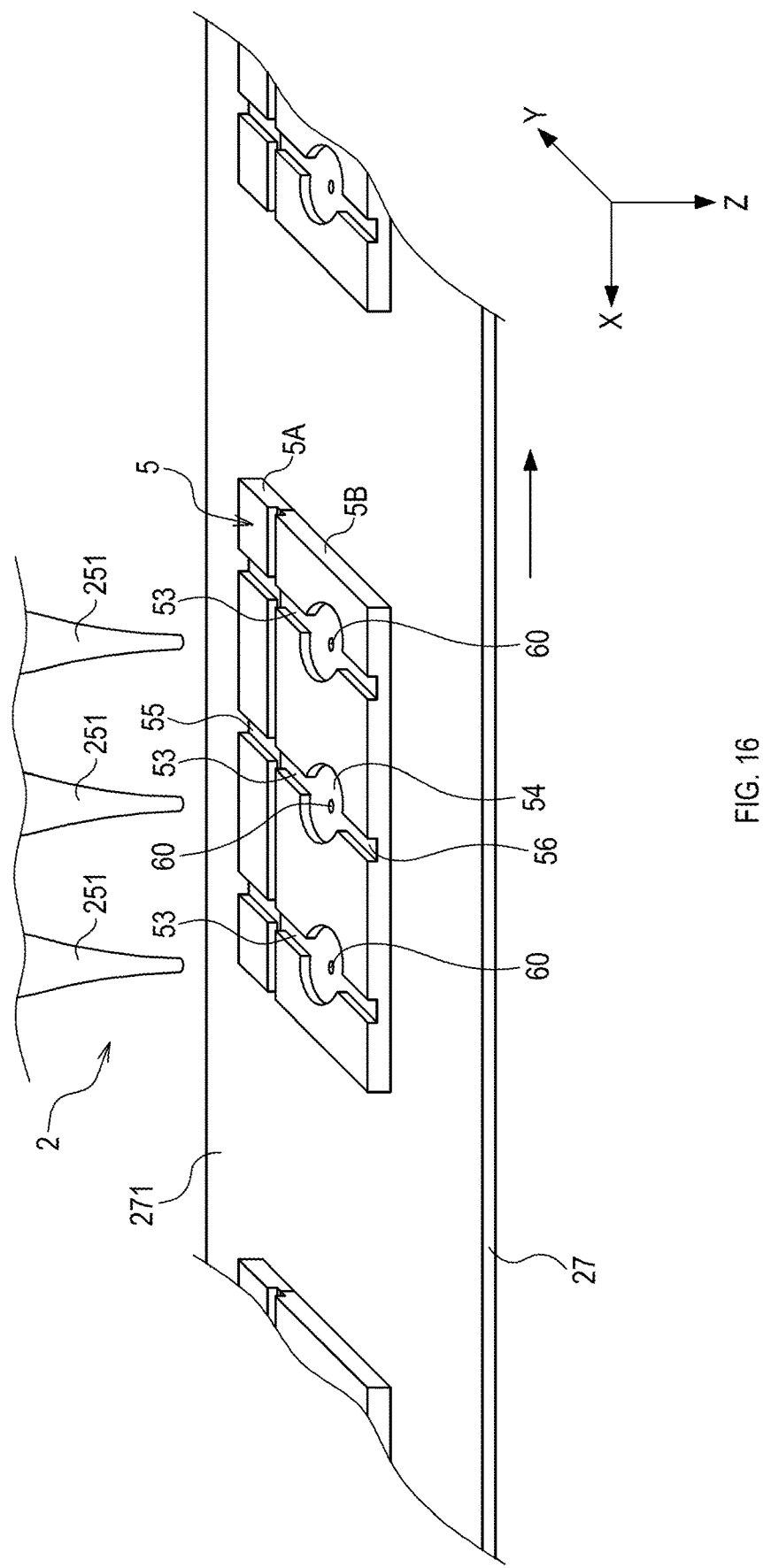
FIG. 16 is a perspective view showing another sowing apparatus.

(1) The above-described embodiment has a configuration in which the grafting member 5 is placed on the first placement surface 261 of the first placement section 26 in the sowing apparatus 2; however, for example, as shown in FIG. 16, a configuration may be employed in which the sowing apparatus 2 comprises a belt conveyer, and the grafting member 5 is placed on a first surface (a placement surface) 271 of a first belt (placement section) 27 that is movable in the X-axis direction. In this case, the sowing operation to the grafting member 5 can be performed continuously, resulting in achievement of further improved efficiency of the sowing operation.

(2) In the above-described embodiment, the sowing apparatus 2 has a single seed pointer 251; however, the sowing apparatus 2 may have a plurality of the seed pointers 251, for example, as shown in FIG. 16. In this case, the seeds 60 of the plants for grafting can be placed simultaneously in a plurality of the plant holders 53 of the grafting members 5, resulting in achievement of further improved efficiency of the sowing operation.

Figure 17:
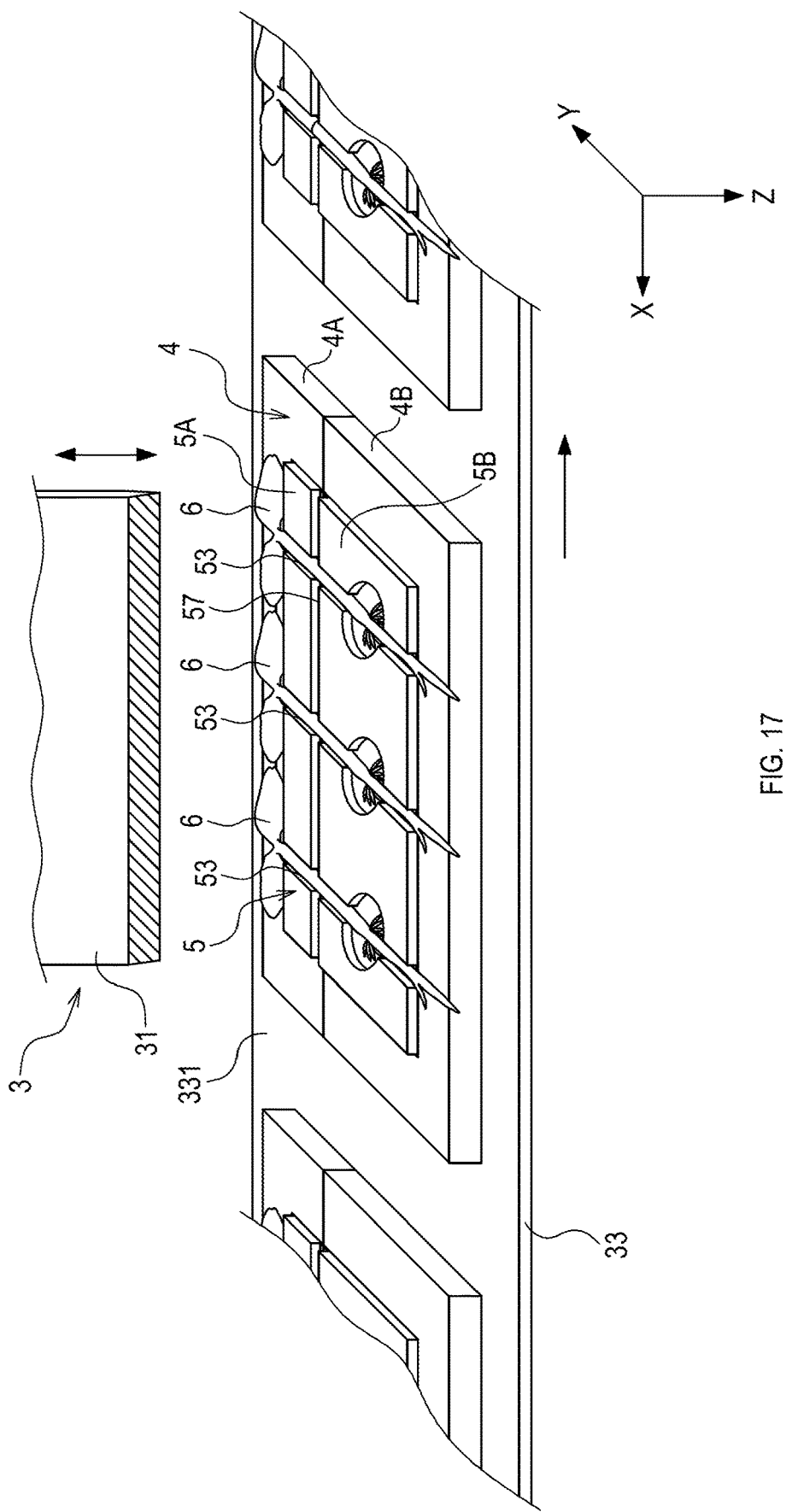
FIG. 17 is a perspective view showing another cutting device.

(3) The above-described embodiment has a configuration in which the grafting member 5 is placed on the second placement surface 321 of the second placement section 32 of the cutting device 3; however, for example, as shown in FIG. 17, a configuration may be employed in which the cutting device 3 comprises a belt conveyer, and the grafting member 5 is placed on a second surface (a placement surface) 331 of a second belt (placement section) 33 that is movable in the X-axis direction. In this case, the cutting operation of the plant for grafting 6 held by the grafting member 5 can be performed continuously, resulting in achievement of further improved efficiency of the cutting operation.

Figure 18:
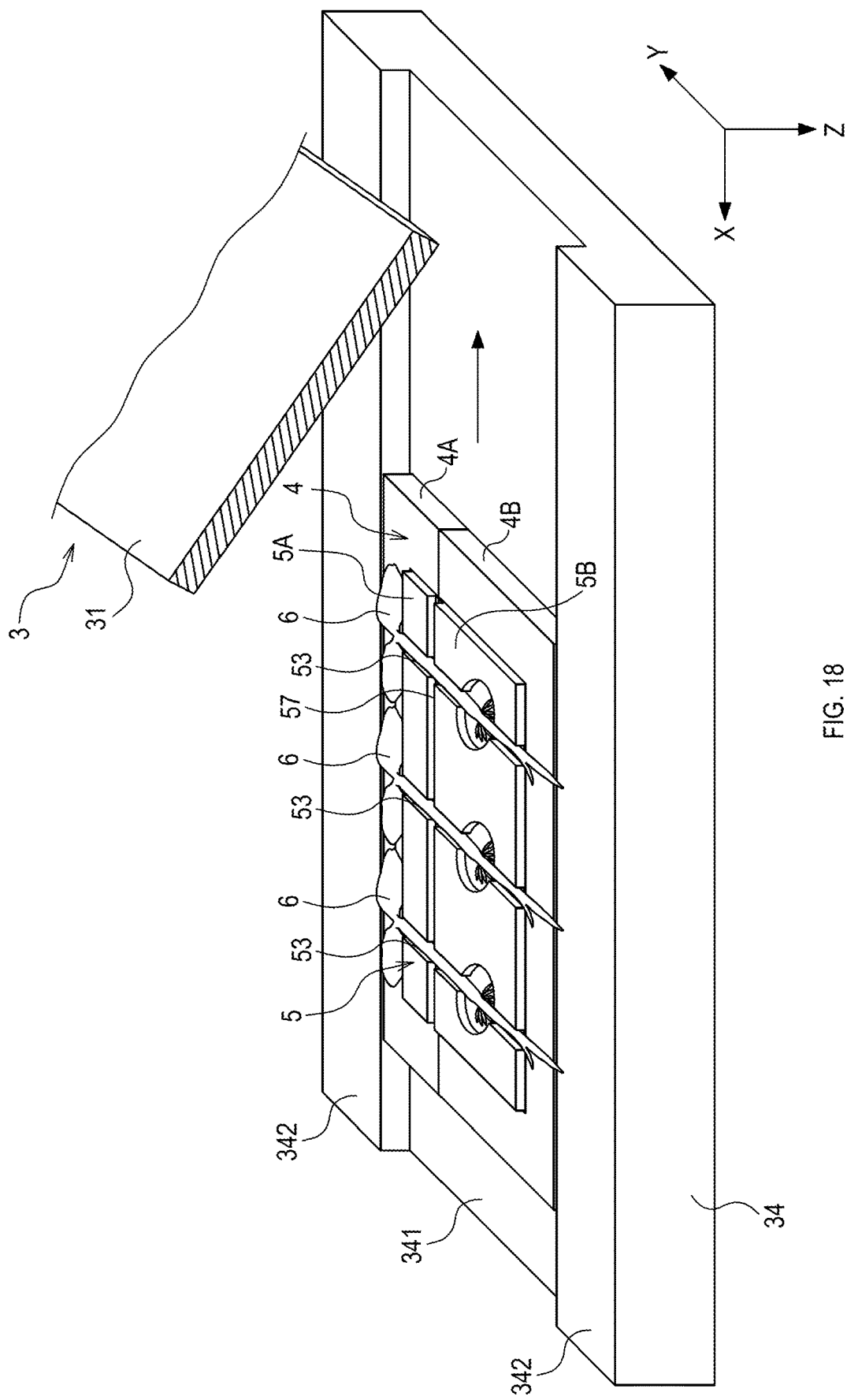
FIG. 18 is a perspective view showing another cutting device.

(4) In the above-described embodiment, the cutting operation is performed by moving the cutting blade 31 of the cutting device 3 while the grafting member 5 is located in a fixed position; however, for example, as shown in FIG. 18, the cutting operation may be performed by moving the grafting member 5 while the cutting blade 31 of the cutting device 3 is located in a fixed position. Specifically, the cutting device 3 comprises the cutting blade 3 and a placement section 34 with a placement surface 341 on which the grafting member 5 is placed. The cutting blade 31 is configured to be fixable at a specified position and a specified angle by a support (not shown) to support the cutting blade 31. That is, the cutting blade 31 is arrangeable such that its blade edge is oblique to the horizontal direction. The placement section 34 comprises a pair of guide portions 342 to guide the joining member 4 that is holding the grafting member 5 in a specified direction (the X-axis direction) to thereby achieve positioning. The placement section 34 may have only a single guide portion 342. By moving the joining member 4 holding the grafting member 5 in the X-axis direction between the paired guide portions 342, the cutting blade 31 of the cutting device 3 passes through the cutting recess 57 of the grafting member 5 in the X-axis direction. As a result, it is possible to continuously cut the stems of the plurality of plants for grafting 6 held by the plurality of plant holders 53 of the grafting member 5. Also, an angle of the cutting blade 31 can be freely adjusted, thus allowing reduced cutting resistance. A lower limit of the angle of the cutting blade 31 relative to the horizontal direction is preferably 5°, and more preferably 15°. An upper limit of the angle is preferably 60°, and more preferably 30°.

(5) Although the grafting apparatus 1 comprises the sowing apparatus 2 in the above-described embodiment, the grafting apparatus 1 need not comprise the sowing apparatus 2. For example, instead of raising seedlings of the plants for grafting 6 in the plant holders 53 of the grafting members 5 as in the present embodiment, seedlings of the plants for grafting 6 raised in a place other than the grafting members 5 may be held by the plant holders 53 of the grafting members 5, and grafting may be performed by the grafting apparatus 1.

(6) Although the rootstock plant 6B and the scion plant 6A are grafted (grafting of two plants) in the above-described embodiment, for example, three plants may be grafted by arranging an intermediate rootstock plant between the rootstock plant and the scion plant. Also, the number of the intermediate rootstock plant may be one or plural. That is, three plants may be grafted, or four or more plants may be grafted. In a case of grafting plural plants, the plural plants may be of the same kind, or of different kinds, or of a combination of these. In a case of grafting plants of different kinds, or grafting plants of the same kind but different in age and size, the grafting members 5 to be used may have the plant holder 53 (the seed storage section 54, the stem storage section 55, and the root storage section 56) that is different in shape, size, etc. depending on each plant (a rootstock plant, a scion plant, or an intermediate rootstock plant).

(7) Although the grafting member 5 comprises the cutting recess 57 in the above-described embodiment, the cutting recess 57 need not be provided. Also, a cutting mark may be provided in place of the cutting recess 57.

(8) Although only the stems of the plants for grafting 6 held by the plant holders 53 of the grafting members 5 are cut by the cutting blade 31 of the cutting device 3 in the above-described embodiment, for example, the stems of the plants for grafting 6 held by the plant holders 53 of the grafting members 5 may be cut together with the grafting members 5. In this case, the entire grafting member 5 may be integrally formed unlike the grafting member 5 in the present embodiment that is splittable into a plurality of parts (the first piece 5A, the second piece 5B).

(9) Although the stems of the plants for grafting 6 are each cut along a direction substantially orthogonal to its axial direction by the cutting blade 31 of the cutting device 3 in the above-described embodiment, the stems of the plants for grafting 6 each may be cut obliquely to its axial direction. In this case, a cut surface has a larger area, resulting in a larger joining area between the cut surfaces of the stems of the plants for grafting 6. The cut surface of the stems of the plants for grafting 6 may be not a flat surface but, for example, an uneven surface. In this case, displacement after joining the cut surfaces of the stems of the plants for grafting 6 can be reduced.

(10) In the above-described embodiment, the stems of the plants for grafting 6 held by the plant holders 53 of the grafting members 5 are cut by the cutting blade 31 of cutting device 3; however, other than the cutting method using the blade, a cutting method using laser, a cutting method using hydraulic pressure, pneumatic pressure, or the like, a cutting method using another cutting member, such as a string, may also be employed as a cutting method. As the cutting method using the blade, for example, a cutting method by rotation of a disk-shaped blade may be employed.

Figure 19:
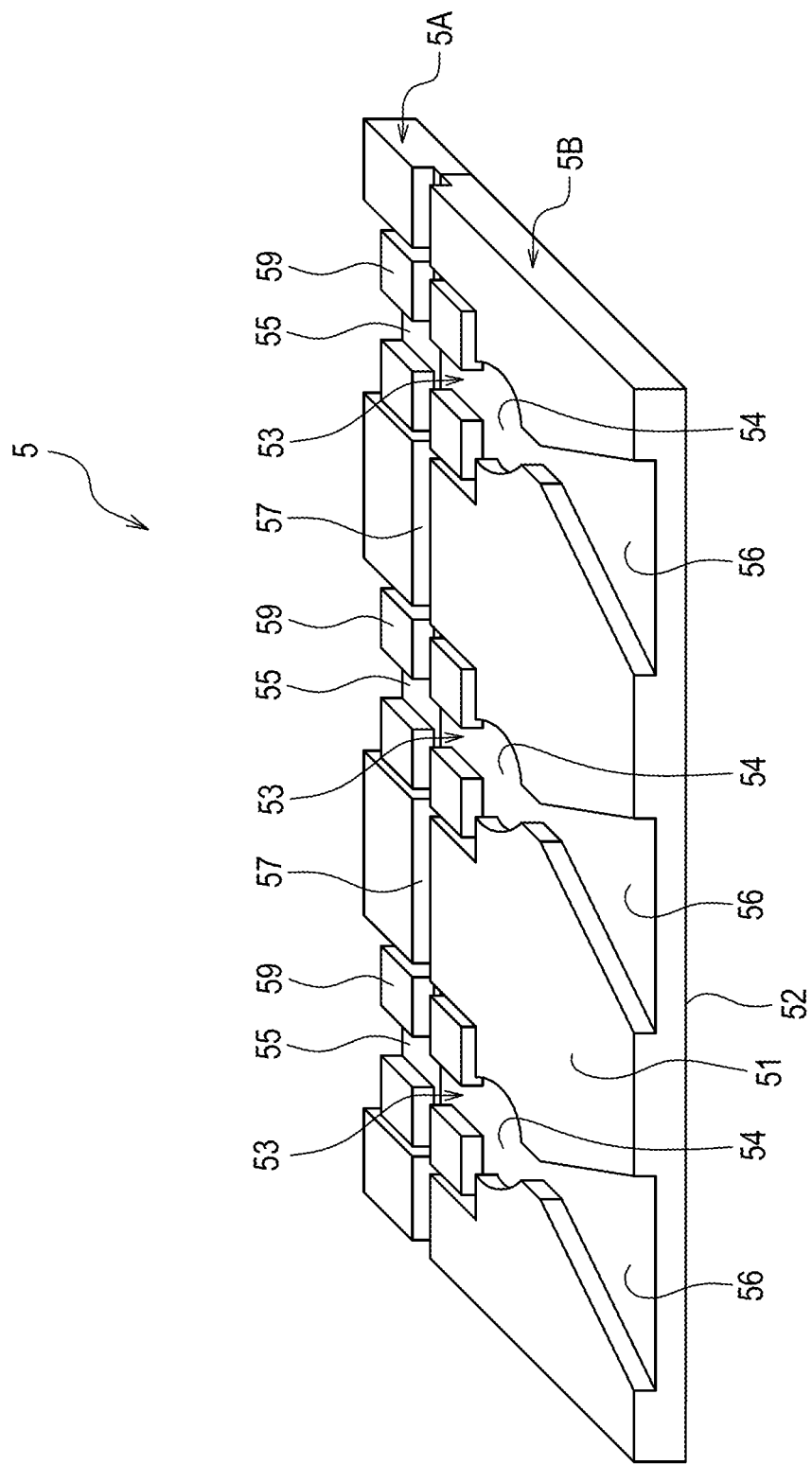
FIG. 19 is a perspective view showing another grafting member.

(11) Although the plant holder 53 of the grafting member 5 comprises the seed storage section 54, the stem storage section 55, and the root storage section 56 in the above-described embodiment, the plant holder 53 is not limited to such configuration and may have any configuration capable of holding the plant for grafting 6. For example, as shown in FIG. 19, block-shaped supports 59 may be provided in the plant holder 53 so as to guide and support extension of the stem of the plant for grafting 6. Also, the plant holder 53 may comprise, for example, a space allowing development of cotyledons in the stem storage section 55, or the like, so that raising seedlings of the plant for grafting 6 can be performed in the plant holder 53 and in a light place from the beginning to the end. Further, the plant holder 53 may comprise a space to house a plant growth medium, for example, in the root storage section 56.

(12) Although the plant holder 53 of the grafting member 5 has a recessed shape in the above-described embodiment, the plant holder is not limited to such configuration but may have any configuration capable of holding the plant for grafting. The plant holder may be, for example, a locking member, such as a pin, to lock the plant for grafting against a main surface of the grafting member on one side in the thickness direction, or may be an adhesive member, such as a glue, to hold the plant for grafting at the main surface of the grafting member on the one side in the thickness direction, or may be convex portions, such as pillars, to hold therebetween at the main surface of the grafting member on the one side in the thickness direction.

(13) Although the grafting member 5 is formed of an elastically deformable resin material, such as silicone rubber, in the above-described embodiment, the grafting member 5 may be formed of, for example, a substantially non-deformable resin material, or may be formed of other materials. Also, the grafting member may be formed of a hydrolyzable resin material, such as polylactic acid, or the like, to allow grafted seedlings produced using the grafting member to be fix planted in a field together with the grafting member without taking out of the grafting member. Further, nutrients may be added to the resin material or the like forming the grafting member, to thereby promote growth of the grafted seedlings after fix planting in the field.

(14) In the above-described embodiment, the seeds of the plant for grafting are germinated in a dark place, and subsequently, the plant holder is moved to a light place for raising seedlings. However, it is not always required to germinate the seeds in a dark place.

(15) It may be possible to divide a function performed by one element in the above-described embodiments into a plurality of elements, or to integrate functions of a plurality of elements into one element. Also, the configurations of the above-described embodiments may be partly omitted. Further, at least a part of a configuration in the above-described embodiments may be added to, or may replace, another configuration of the above-described embodiments. Any form that falls within the scope of the technical ideas defined in the language of the appended claims may be an embodiment of the present disclosure.

The invention claimed is:

1. A grafting apparatus comprising:
at least one grafting member, each grafting member comprising:
a first piece;
a second piece couplable to and separable from the first piece; and
at least one plant holder comprising a recessed shape so as to hold a plant for grafting, wherein the at least one plant holder extends over the first piece and the second piece, and is configured to be split into two with the plant for grafting; and
a cutter configured to cut a stem of the plant for grafting that is held by the at least one plant holder of each of the at least one grafting member; and
a joiner configured to mutually join at least parts of the at least one grafting member, while the at least one plant holder holds a part of the plant for grafting that has been cut by the cutter, to thereby mutually join parts of the plants for grafting,
wherein the cutter is configured to cut the plant for grafting into a portion held by the first piece and a portion held by the second piece, and
wherein the joiner mutually joins the first piece and the second piece, to thereby mutually join the portion of the plant for grafting held by the first piece and the portion of the plant for grafting held by the second piece.

2. The grafting apparatus according to claim 1,
wherein the cutter comprises a placement section including a placement surface configured to place thereon the grafting member.

3. The grafting apparatus according to claim 1,
wherein the joiner comprises joining holders each to hold at least a part of the grafting member, while the at least one plant holder holds the part of the plant for grafting that has been cut by the cutter, and
wherein the joiner is configured to mutually join at least parts of the at least one grafting member held by the joining holders, to thereby mutually join parts of the plants for grafting.

4. The grafting apparatus according to claim 1,
wherein each of the at least one grafting member has a plate shape, and
wherein the at least one plant holder is formed, in the main surface on the one side in the thickness direction of each of the at least one grafting member, to have a recessed shape that is open toward the one side in the thickness direction.

5. The grafting apparatus according to claim 4,
wherein each of the at least one grafting member comprises a cutting recess having a recessed shape and arranged in the main surface on the one side so as to intersect the at least one plant holder,
wherein the cutter comprises a cutting blade configured to cut the stem of the plant for grafting, and
wherein the cutting blade is configured to relatively move in the cutting recess of each of the at least one grafting member, to thereby cut the stem of the plant for grafting held by the at least one plant holder of each of the at least one grafting member.

6. The grafting apparatus according to claim 4, further comprising:
a sower configured to place at least one seed of the plant for grafting in the at least one plant holder of each of the at least one grafting member.

7. The grafting apparatus according to claim 6,
wherein the sower comprises:
a seed container configured to be capable of containing a plurality of the seeds;
a seed ejector configured to be capable of ejecting the at least one seed from the seed container; and
a seed discharger configured to discharge the at least one seed ejected by the seed ejector to the at least one plant holder of each of the at least one grafting member.

8. The grafting apparatus according to claim 6,
wherein the at least one plant holder of the at least one grafting member comprises a seed storage section configured to place the at least one seed therein, and wherein the sower is configured to place the at least one seed in the seed storage section of the at least one plant holder of each of the at least one grafting member.

9. A sowing apparatus comprising:
at least one grafting member, each grafting member comprising:
   at least one plant holder comprising a recessed shape so as to hold a plant for grafting; and
a sower configured to place at least one seed of the plant for grafting in the at least one plant holder of each of the sat least one grafting member,
wherein the at least one plant holder comprises:
   a seed storage section including an opening configured to place the at least one seed therein; and
   a stem storage section allowing extension therethrough of a stem growing from the at least one seed placed in the seed storage section, and
wherein the sower is configured to place the at least one seed in the seed storage section.

10. The sowing apparatus according to claim 9, wherein the sower comprises:
   a seed container configured to be capable of containing a plurality of the seeds;
   a seed ejector configured to be capable of ejecting at least one seed from the seed container; and
   a seed discharger configured to discharge the at least one seed ejected by the seed ejector to the at least one plant holder of each of the grafting members.

11. A grafted seedling production method using grafting members, each grafting member comprising a first piece, a second piece couplable to and separable from the first piece, and at least one plant holder comprising a recessed shape so as to hold a plant for grafting and extending over the first piece and the second piece, the method comprising:
   cutting stems of the plants for grafting that are held by the plant holders each into a portion held by the first piece and a portion held by the second piece;
   separating each of the grafting members at a cut section of the plant for grafting into the first piece and the second piece so that the at least one plant holder is split into two together with the plant for grafting; and
   mutually joining the first piece and the second piece, to thereby mutually join cut parts of the plants for grafting.

12. The grafted seedling production method according to claim 11,
wherein at least one of cutting the stems, separating each of the grafting members, or mutually joining the parts of the plants for grafting is performed automatically.

13. The grafted seedling production method according to claim 11, further comprising:
healing the joined plant for grafting in the at least one plant holder of the joined grafting members.

14. A grafted seedling production system comprising:
grafting members, each grafting member comprising:
   a first piece;
   a second piece couplable to and separable from the first piece; and
   at least one plant holder comprising a recessed shape so as to hold a plant for grafting and extending over the first piece and the second piece;
a cutter to cut stems of the plants for grafting that are held by the plant holders each into a portion held by the first piece and a portion held by the second piece;
a separator to separate each of the grafting members at a cut section of the plant for grafting into the first piece and the second piece so that the at least one plant holder is split into two together with the plant for grafting; and
a joiner to mutually join the first piece and the second piece, to thereby mutually join cut portions of the plants for grafting.

15. The grafted seedling production system according to claim 14,
wherein at least one of the cutter, the separator, or the joiner operates automatically.

16. The grafted seedling production system according to claim 14, further comprising:
a healer to heal the joined plant for grafting in the at least one plant holder of the joined grafting member.

17. The grafted seedling production method according to claim 11, further comprising:
   placing a seed of the plant for grafting in a seed storage section of the at least one plant holder of each of the grafting members;
   germinating the seeds; and
   raising seedlings of the plants for grafting by allowing each of the stems growing from the seeds to extend in a stem storage section of the at least one plant holder subsequent to germination of the seeds.

18. The grafted seedling production system according to claim 14, further comprising:
   a sower to place a seed of the plant for grafting in a seed storage section of the at least one plant holder of each of the grafting members;
   a germinator to germinate the seeds; and
   a seedling raising device to raise seedlings of the plants for grafting by allowing each of the stems growing from the seeds to extend in a stem storage section of the at least one plant holder subsequent to germination of the seeds.

* * * * *